(12) United States Patent
Cardenas Gonzalez et al.

(10) Patent No.: US 12,228,770 B2
(45) Date of Patent: Feb. 18, 2025

(54) LITHOGRAPHY-FREE INTEGRATED PHOTONIC FPGA

(71) Applicant: University of Rochester, Rochester, NY (US)

(72) Inventors: Jaime Cardenas Gonzalez, Rochester, NY (US); Yi Zhang, Rochester, NY (US); Marissa Granados-Baez, Rochester, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 18/618,131

(22) Filed: Mar. 27, 2024

(65) Prior Publication Data

US 2024/0231007 A1    Jul. 11, 2024

Related U.S. Application Data

(63) Continuation of application No. 17/894,417, filed on Aug. 24, 2022, now Pat. No. 11,966,084.

(60) Provisional application No. 63/260,544, filed on Aug. 25, 2021.

(51) Int. Cl.
   *G02B 6/35*      (2006.01)
   *G02F 1/313*    (2006.01)

(52) U.S. Cl.
   CPC ........... *G02B 6/3546* (2013.01); *G02F 1/313* (2013.01)

(58) Field of Classification Search
   None
   See application file for complete search history.

(56) References Cited

U.S. PATENT DOCUMENTS

| | | | |
|---|---|---|---|
| 10,061,088 | B1 | 8/2018 | Peng |
| 2017/0139128 | A1* | 5/2017 | Miller ................. G02B 6/2848 |
| 2018/0246391 | A1 | 8/2018 | Sun et al. |
| 2021/0231876 | A1 | 7/2021 | Kumar |

OTHER PUBLICATIONS

Miller, S.A., et al., "Low-loss silicon platform for broadband mid-infrared photonics," Optical Society of America, vol. 4, No. 7, Jul. 2017 (pp. 707-712).

Harris, N.C., et al., "Linear programmable nanophotonic processors," Optical Society of America, vol. 5, No. 12, Dec. 2018 (pp. 1623-1631).

Zhuang, L., et al., "Programmable photonic signal processor chip for radiofrequency applications," Optical Society of America, vol. 2, No. 10, Oct. 2015 (pp. 854-859).

Bogaerts, W., et al., "Programmable photonic circuits," Nature, vol. 586, Oct. 8, 2020 (pp. 207-216).

Zheng, J., et al. "GST-on-silicon hybrid nanophotonic integrated circuits: a non-volatile quasi-continuously reprogrammable platform," Optical Materials Express, vol. 8, No. 6, Jun. 1, 2018 (pp. 1551-1561).

(Continued)

*Primary Examiner* — Jerry Rahll
(74) *Attorney, Agent, or Firm* — Kilpatrick Townsend & Stockton LLP

(57) ABSTRACT

A tunable waveguide element includes a waveguide core and a waveguide cladding. A high k dielectric layer is between the waveguide core and the waveguide cladding. An electrode is disposed between the high k dielectric layer and the waveguide core. The electrode can be made of a two-dimensional material and/or monolayer.

16 Claims, 20 Drawing Sheets

(56) References Cited

OTHER PUBLICATIONS

Phare, C.T., et al., "Graphene electro-optic modulator with 30 GHz bandwidth," National Photonics, vol. 9, Aug. 2015 (pp. 511-514).
Datta, I., et al., "Low-loss composite photonic platform based on 2D semiconductor monolayers," National Photonics, vol. 14, Apr. 2020 (pp. 256-262).
Bae, S., et al., "Roll-to-roll production of 30-inch graphene films for transparent electrodes," Nature Nanotechnology, vol. 5, Aug. 2010, (pp. 574-578).
Castellanos-Gomez, A., et al., "Deterministic transfer of two-dimensional materials by all-dry viscoelastic stamping," 2D Materials, vol. 1, 2014 (Jan. 10, 2002).
Benes, V.E., "Mathematical Theory of Connecting Networks and Telephone Traffic," (1965), (pp. 1-317) https://www.google.com/books/edition/Mathematical_Theory_of_Connecting_Networ/CANItcFRRHMC?hl=en&gbpv=1&pg=PR13&printsec=frontcover.
Soref, R., "Tutorial: Integrated-photonic switching structures," APL Photonics, 3, (2018) Feb. 11, 2001.
Nauriyal, J., et al., "Fiber-to-chip fusion splicing for low-loss photonic packaging," Optical Society of America, 2019 (pp. 549-552).
Cardenas, J., et al., "Wide-bandwidth continuously tunable optical delay line using silicon microring resonators," Optics Express, vol. 18, No. 25, Dec. 6, 2010, (pp. 26525-26534).
Song, M., et al., "Enhanced On-Chip Phase Measurement by Weak Value Amplification," Conference on Lasers and Electro-Optics (CLEO) 2020, (pp. 1-2).
Granados-Baez, M., et al., "On-Chip Monolayer WSe2 Microring Laser Operating at Room Temperature," Conference on Lasers and Electro-Optics (CLEO), 2020, Optical Society of America (2020), paper SF2J.5.
Phare, C.T., et al., "Linear Graphene on Silicon Nitride Electroabsorption Modulators for RF-Over-Fiber Links," Conference on Lasers and Electro-Optics (CLEO), (2016), Opticial Society of America (2016), paper SF2G.2.
Cardenas, J., et al., "Optical nonlinearities in high-confinement silicon carbide waveguides," Optics Letters, vol. 40, No. 17, Sep. 1, 2015, (pp. 4138-4141).
Cardenas, J., et al., "Low loss etchless silicon photonic waveguides," Optic Express, vol. 17, No. 6, Mar. 2009, (pp. 4752-4757).
Ji, X., et al., "Ultra-low-less on-chip resonators with sub-milliwatt parametric oscillation threshold," Optical Society of America, vol. 4, No. 6, Jun. 2017 (pp. 619-624).
Cheng, Qixiang, et al., "Silicon Photonics Codesign for Deep Learning", Proceedings of the IEEE, IEEE, vol. 108, No. 8, Aug. 8, 2020 (pp. 1261-1282).
ISA/EPO International Search Report and Written Opinion for corresponding International Application No. PCT/US2022/042630 dated May 9, 2023.
U.S. Appl. No. 17/894,417, Notice of Allowance dated Dec. 15, 2023.
U.S. Appl. No. 17/894,417, Office Action dated Aug. 24, 2023.

\* cited by examiner

PRIOR ART
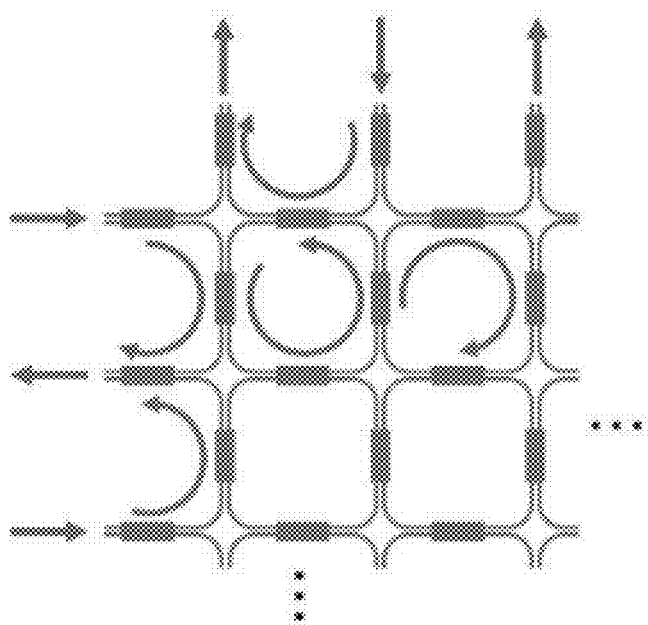
FIG. 10
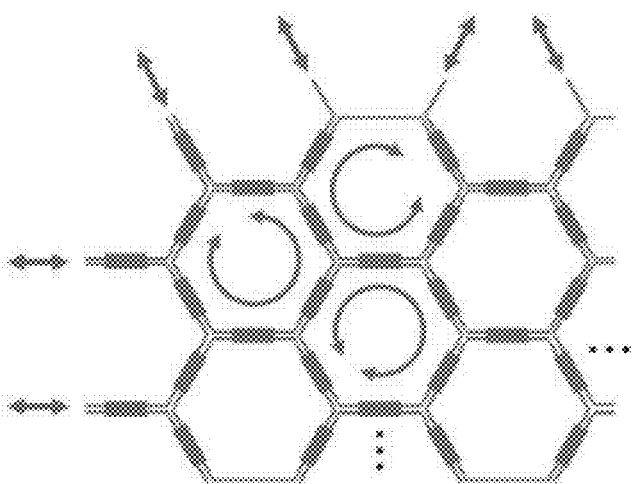
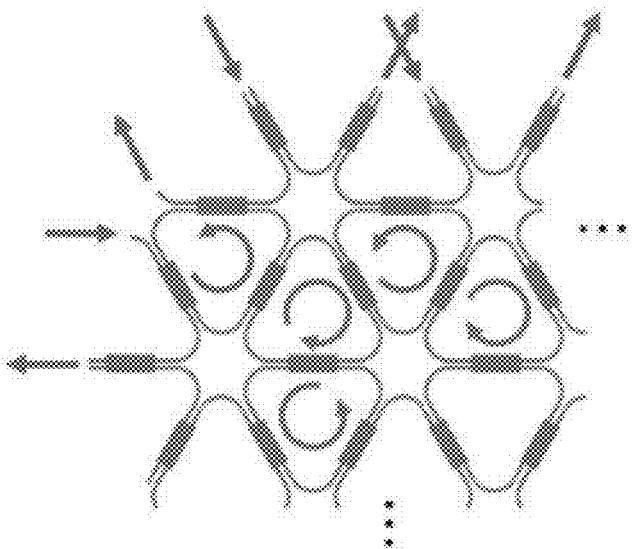

LITHOGRAPHY-FREE INTEGRATED PHOTONIC FPGA

CROSS-REFERENCE TO RELATED APPLICATIONS

This application is a continuation of U.S. non-provisional patent application Ser. No. 17/894,417, titled LITHOGRAPHY-FREE INTEGRATED PHOTONIC FPGA, filed Aug. 24, 2022, which application claims priority to and the benefit of U.S. provisional patent application Ser. No. 63/260,544, titled LITHOGRAPHY-FREE INTEGRATED PHOTONIC FPGA, filed Aug. 25, 2021, which applications are incorporated herein by reference in their entireties for all purposes.

FIELD OF THE APPLICATION

The application relates to photonic integrated circuits, particularly to programmable photonic integrated circuits.

BACKGROUND

Integrated photonic devices of the prior art are defined using lithography during fabrication and have limited reconfigurability. Past attempts at lithography-free waveguides have used phase change materials, which have optical loss and cannot operate at elevated temperatures.

SUMMARY

An integrated tunable waveguide element includes: a cladding. A high k dielectric layer is disposed within the cladding. At least one waveguide is disposed adjacent to the high k dielectric layer. At least one two dimensional monolayer pad is disposed on or in the high k dielectric layer adjacent to a portion of the at least one waveguide.

The cladding can include a $SiO_2$ layer.

The waveguide can include a silicon nitride or a silicon carbide. The waveguide can include a lithium niobite or a lithium tantanate. The waveguide can include a glass or a polymer.

The high k dielectric layer can include an $Al_2O_3$ layer.

The at least one two dimensional monolayer pad can include a graphene monolayer. The at least one two dimensional monolayer pad can include a transition metal dichalcogenide monolayer.

The at least one two dimensional monolayer pad can be configured to be charged with respect to a substrate on which the integrated tunable waveguide element is disposed. The at least one two dimensional monolayer pad can be configured to be charged with respect to at least one additional two dimensional monolayer pad.

The integrated tunable waveguide element can further include one or more additional at least one two dimensional monolayer pads disposed on or in the high k dielectric layer and about above or below the at least one two dimensional monolayer pad.

A 2×2 switch including at least two waveguides as described hereinabove. Each of the waveguides can include two curved waveguide portions. A controlled portion of each waveguide between the two curved waveguide portions can be about adjacent to each other. The controlled portion of each waveguide can be configured to be controlled by a voltage applied to each of the at least one two dimensional monolayer pad.

An integrated 2×2 array element includes in cross section: a cladding, a high k dielectric layer of disposed within the cladding, a first waveguide and a second waveguide disposed adjacent to the high k dielectric layer, at least one two dimensional monolayer pad disposed on or in the high k dielectric layer adjacent to a portion of the first waveguide and the second waveguide. In a plane of a layer perpendicular to the cross section: the first waveguide includes two curves to first controlled waveguide section, and about parallel. The second waveguide includes two curves to second controlled waveguide section. The curves cause the first controlled waveguide section and the second controlled waveguide section to be closer to each other than the first waveguide and the second waveguide about parallel waveguides before and after the curves. The at least one two dimensional monolayer pad is disposed on or in the high k dielectric layer adjacent to each controlled portion of the first waveguide and the second waveguide.

The integrated 2×2 array element can be configured such that on application of a voltage above a low voltage threshold and below a high voltage threshold to the two dimensional monolayer pad of the first waveguide, and an application of a voltage above a different high voltage threshold to the two dimensional monolayer pad of the second waveguide, a light of the second waveguide is substantially not propagated into the first waveguide. The integrated 2×2 array element can be configured such that on application of a voltage below a different low voltage threshold to the two dimensional monolayer pad of the second waveguide, and an application of arbitrary voltage to the two dimensional monolayer pad of the first waveguide, the second waveguide is lossy and a light of the second waveguide is not passed through either of the first waveguide or the second waveguide.

An array of integrated photonic elements can include a 2D mesh network of integrated 2×2 array elements as described hereinabove.

The array of the integrated photonic elements can include at least two or more 2×2 array elements configured as a Mach-Zehnder coupler. The array of the integrated photonic elements can include at least two or more 2×2 array elements configured as a phase tuning element. The array of the integrated photonic elements can include at least two or more 2×2 array elements configured as a ring resonator. The array of the integrated photonic elements can further include at least one photonic device including a plurality of configurable waveguide pixels.

An integrated photonic device includes an array of waveguide pixels. Each waveguide pixel is an individually electrically addressable waveguide pixel electrically gated to an optically transparent state, or to an optically opaque state. An electrical selection of a pattern of waveguide pixel states of each of the individually electrically addressable waveguide pixel of the array of waveguide pixels, programmatically creates at least one optical device.

The integrated photonic device can include an optical network of a plurality of optically interconnected photonic devices.

An individually electrically addressable waveguide pixel charged by an applied voltage becomes optically transparent.

The individually electrically addressable waveguide pixel of the array of waveguide pixels includes a dielectric capacitor waveguide core as an electrically controllable switchable waveguide. The electrically controllable switchable waveguide includes a first 2D layer including a first electrode material which is disposed over and adjacent to a dielectric waveguide layer disposed over and adjacent to, a second 2D layer including a second electrode material, and a cladding which is disposed above and below the dielectric capacitor waveguide core.

At least one of the first 2D layer and the second 2D layer can include a monolayer. At least one of the first 2D layer and the second 2D layer can include a bilayer. At least one of the first 2D layer and the second 2D layer can include a tri-layer. At least one of the first 2D layer and the second 2D layer can include a transition metal dichalcogenide (TMDC). At least one of the first 2D layer and the second 2D layer can include a graphene layer.

The dielectric waveguide layer can include an aluminum oxide. The dielectric waveguide layer can include a high k dielectric. The dielectric waveguide layer can include a material having a refractive index higher than a refractive index of the cladding.

The integrated photonic device can include a lithography-free integrated photonic field programmable gate array (FPGA).

By electrical selection of patterns of waveguide pixels of the array of waveguide pixels, the integrated photonic device can include at least one multielement waveguide. By electrical selection of patterns of waveguide pixels of the array of waveguide pixels, the integrated photonic device can include at least one 2×2 splitter or at least one 2×2 switch. By electrical selection of patterns of waveguide pixels of the array of waveguide pixels, the integrated photonic device can include at least one amplitude modulator.

The integrated photonic device can include at least two different waveguides having a relative phase with respect to each other. The at least two different waveguides can include a first waveguide gated by a first voltage and a second waveguide gated by a second voltage different from the first voltage. At least two different waveguides can include a first waveguide of a first length and a second waveguide of a second length different from the first length.

By electrical selection of patterns of waveguide pixels of the array of waveguide pixels, the integrated photonic device can include two tunable 2×2 splitters configured as a Mach-Zehnder interferometer.

By electrical selection of patterns of waveguide pixels of the array of waveguide pixels, the integrated photonic device can include a programmable photonic network.

A waveguide pixel includes a dielectric capacitor waveguide core as an electrically controllable switchable waveguide. The electrically controllable switchable waveguide includes a first 2D layer including a first electrode material disposed over and adjacent to a dielectric waveguide layer disposed over and adjacent to, a second 2D layer including a second electrode material, and a cladding disposed above and below the dielectric capacitor waveguide core.

At least of one of the first 2D layer or the second 2D layer can include at least one of: a monolayer, a bilayer, and a tri-layer.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 2C is a graph showing a confined mode when the field is on;

FIG. 10 is a drawing showing typical array design based on 2×2 tunable switches of the prior art [2]

DETAILED DESCRIPTION

Figure 1:
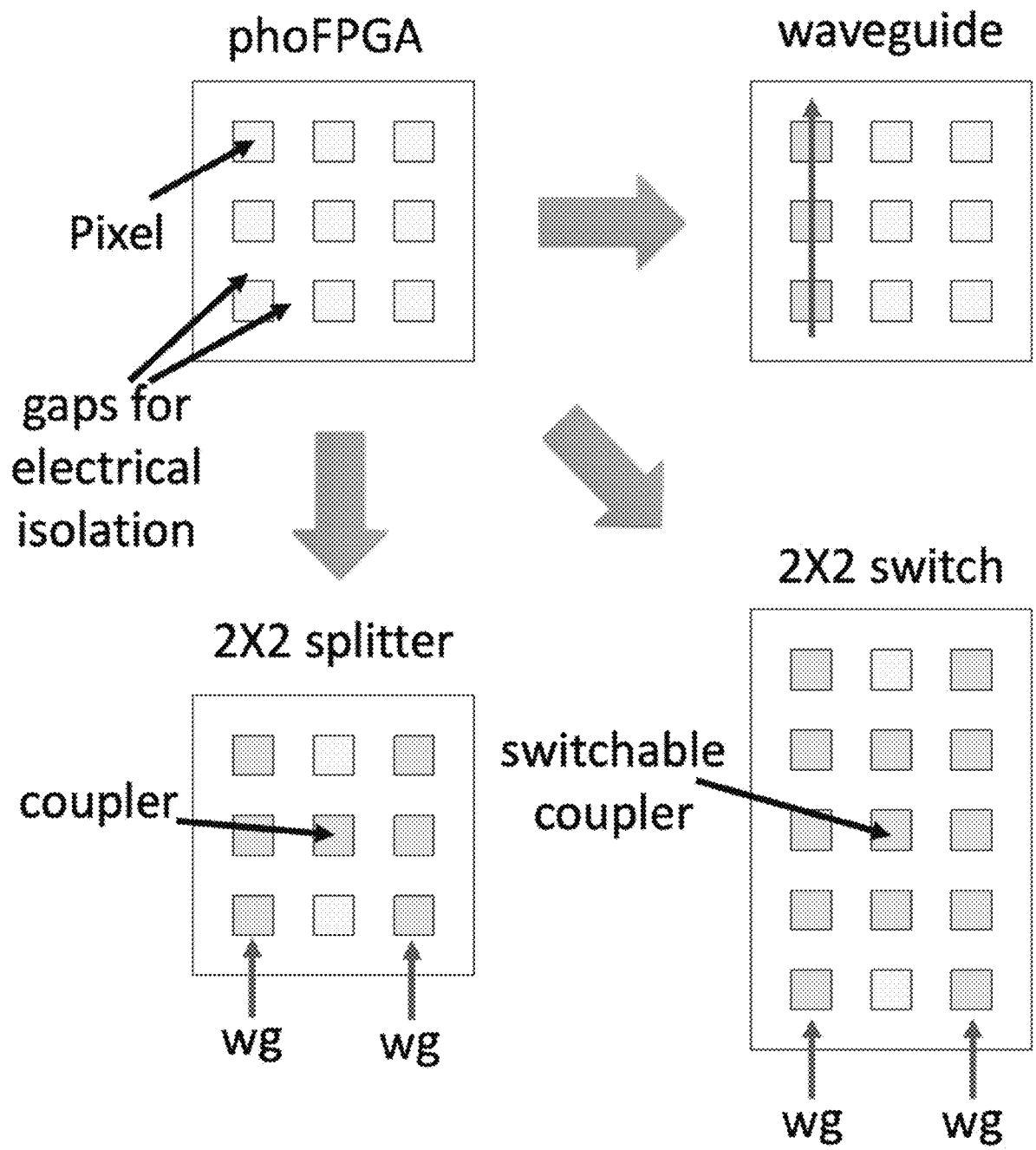
FIG. 1 is a drawing showing an exemplary phoFPGA platform according to the Application, including a waveguide, a 2×2 splitter, and a 2×2 switch.

In the description, other than the bolded paragraph numbers, non-bolded square brackets ("[ ]") refer to the citations listed hereinbelow.

The Application is in 5 parts: Part 1—Introduction to lithography-free integrated photonic FPGA, Part 2—Integrated photonic FPGA: design methodology and fundamental limits, Part 3—Integrated photonic FPGA platform basic components, Part 4—a Programmable photonic network, and Part 5—Tunable Waveguide.

Definitions phoFPGA—An integrated photonic field programmable gate array (phoFPGA) is described as an example of a lithography-free integrated photonic platform based on the integration of two-dimensional materials and standard dielectrics according to the Application.

2D layer—As used hereinbelow, a 2D material layer is mostly typically a nm scale layer, most often, a monolayer of atoms or molecules, such as, for example, a monolayer transition metal dichalcogenide (TMDC) or a graphene monolayer. Still at molecular level thickness, a 2D layer can also include a bilayer or a tri-layer (atomic or molecular layers) still having a total 2D layer thickness measured in nm. 2D layers as used in the Application, do not include much thicker layers (thicker by orders of magnitude), such as, for example, a μm thick silicon dioxide integrated planar cladding layer.

optically transparent state—an optically transparent state includes a range of transparency, from about transparent (i.e. more transparent than a corresponding about opaque state for the same waveguide pixel) to fully transparent.

optically opaque state—an optically opaque state includes a range of opaqueness, from about opaque (i.e. more opaque than an about transparent state for the same waveguide pixel) to fully opaque.

Part 1—Introduction to Lithography-Free Integrated Photonic FPGA

As described hereinabove, integrated photonic devices are defined using lithography during fabrication and have limited reconfigurability. Past attempts at lithography-free waveguides have used phase change materials, which have optical loss and cannot operate at elevated temperatures.

Photonic integrated circuits have enabled tremendous advances in communications and signal processing; however, each photonic integrated circuit has a fixed functionality determined by the permanent, lithographically patterned waveguide layout set during chip fabrication. Current efforts to create programmable photonic chips are based on standard, lithographically patterned waveguides with cascaded interferometers, modulators, detectors, and light sources, which limit their programming.

This Application describes a lithography-free integrated photonic platform based on the integration of two-dimensional materials and standard dielectrics to create an exemplary integrated photonic field programmable gate array (phoFPGA), and more generally to make integrated photonic programmable networks. The programmable integrated photonic platform is based on waveguides that are defined with electric fields that are applied across a dielectric slab lined with two-dimensional materials.

The devices, structures, system, and methods of a lithography-free integrated photonic FPGA according to the Application provide a new approach to integrated photonics with a first of its kind pixel-based photonic fabric. A design and simulation methodology for the phoFPGA programming can provide the basic building blocks of a photonic network: waveguides, bends, power splitters, and switches. These waveguides, bends, power splitters, and switches can be fabricated together to make a reconfigurable photonic network on a phoFPGA chip.

This Application describes a new lithography free integrated photonic platform to enable an integrated photonic field programmable gate array. Exemplary devices, structures, system, and methods, are referred to as integrated photonic FPGA or phoFPGA devices, structures, system, and methods. The new platform uses photonic waveguides created by applying an electric field across a dielectric capacitor lined with a 2D layer, such as, for example, a monolayer of transition metal dichalcogenides (TMDC) and/or graphene. As will be better understood following the examples, any other suitable materials and any suitable combinations thereof, can be used to make a lithography-free integrated photonic FPGA according to the structures and methods described hereinbelow.

In the exemplary phoFPGA, when the electric field is activated, the refractive index of the TMDC and graphene changes significantly which enables horizontal waveguide confinement. The electrical nature of the reconfiguration mechanism enables fast switching time between states of the phoFPGA. The photonic platform described by the Application breaks away from traditional photonic devices in which the structures are lithographically defined during fabrication and remain fixed thereafter. The waveguides and devices in the phoFPGA platform can be created on-demand and can be easily and rapidly reconfigured.

The described platform can transform the field by enabling 1. lithography-free photonic waveguides, 2. full control over an integrated photonic structure post-fabrication, and 3. fast reconfiguration time. A lithography-free integrated photonic FPGA according to the Application could transform the current state of the art presently based on traditional lithographically defined waveguides and limited device control which is locked in at time of manufacture, by the lithography manufacturing process.

Current efforts to create programmable photonic networks are based on standard, lithographically based photonic waveguides [1]. Because the waveguides are permanently defined by the lithography process, these structures require phase control and interferometry to route light through the device. As such, these prior art structures are only partially programmable.

Other approaches to form lithography-free waveguides have been based on phase change materials. These materials go from absorbing to quasi-transparent when heated by changing their phase from amorphous to polycrystalline [2]. This phase change material approach requires laser written waveguides (which limits the scalability of the device), or the use of pre-patterned heaters. However, even in the transmissive state, these materials still have high optical absorption loss around 4,000 dB/cm [2].

A lithography-free integrated photonic FPGA according to the Application can enable a fully programmable platform where the waveguides are generated on-demand rather than defined lithographically during fabrication. Lithography-free integrated photonic FPGA according to the Application makes possible integrated photonic devices that can be programmed in the field to perform the desired function. The waveguides are defined by applied electric fields which are controlled at the chip level, instead of using lithography.

FIG. 1 is a drawing showing an exemplary phoFPGA platform according to the Application, including a waveguide, a 2×2 splitter, and a 2×2 switch. The result of lithography-free integrated photonic FPGA according to the Application is an unprecedented flexibility in programming.

A lithography-free integrated photonic FPGA according to the Application can be used to provide an arbitrarily programmable integrated photonic network. For example, the platform can be used to provide on-chip, fully reconfigurable photonic networks.

Integrated photonic circuits are formed with a permanent, lithographically patterned waveguide layout on a chip. Because the waveguides are permanently patterned, the photonic circuit is challenging to reconfigure. Several mesh concepts have been developed where 2×2 switches are cascaded to create a reconfigurable waveguide topology that can be used for routing or signal processing [1]. However, because the waveguides are permanently patterned, we can only work within its preset permanently patterned structure which is not optimal or even suitable for many applications.

The Application describes an integrated photonic platform where waveguides are defined with electric fields applied across a dielectric slab lined with two-dimensional materials. Fundamentally, a waveguide is composed of a high refractive index region surrounded by a low refractive index region. Field confinement in the vertical direction (i.e. perpendicular to the plane of the chip) is achieved by simply depositing a higher refractive index material between two lower index materials without the need of lithography (i.e. a slab waveguide). However, horizontal confinement (within the plane of the chip), is typically achieved by optical lithography and etching, which predefines the device functionality and introduces defects in the photonic structures. Instead of using lithography, we can achieve the difference in refractive index between the core and cladding regions by changing the refractive index of the material via temperature, material phase transition, mechanical actuation, or electric field to achieve horizontal confinement.

The Application describes a reconfigurable network of photonic waveguides and devices by leveraging the giant change in refractive index of two-dimensional materials with applied static electrical charge [3, 4].

Example

Figure 2A:
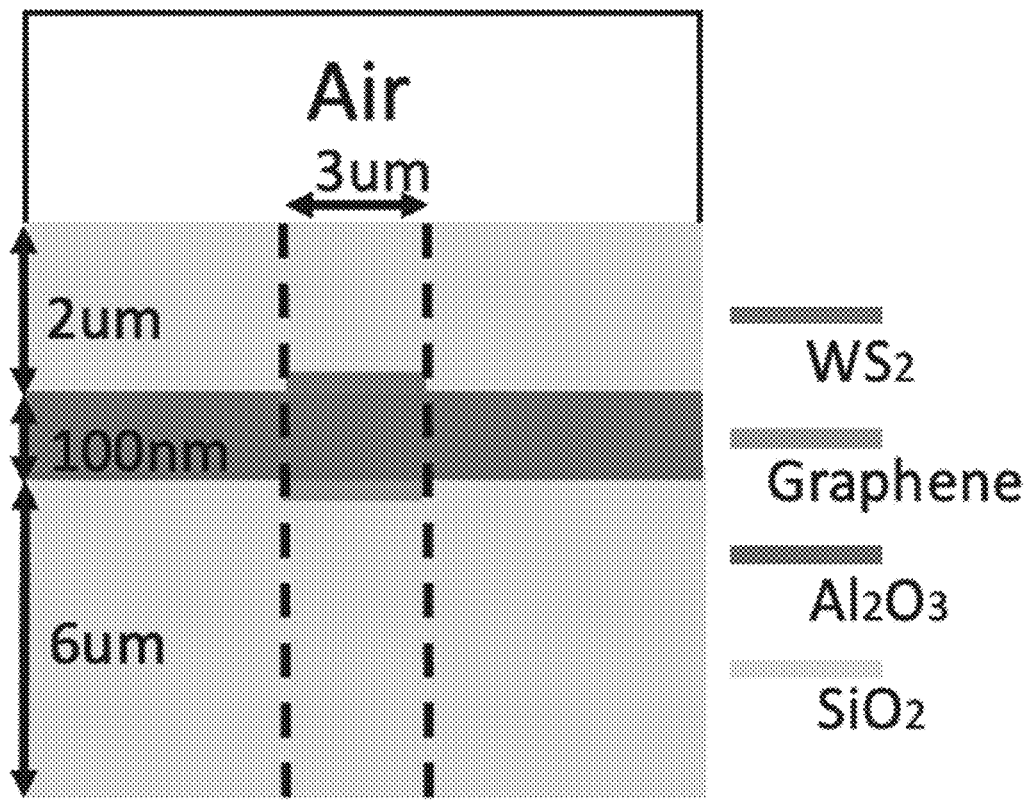
FIG. 2A is a drawing showing a cross section of an exemplary waveguide cross section.

An exemplary lithography-free integrated photonic FPGA structure includes a stack of a monolayer of tungsten disulfide ($WS_2$) followed by a layer of a high-k dielectric, such as aluminum oxide, with a layer of graphene. The stack forms a $WS_2$-dielectric-graphene capacitor FIG. 2A is a drawing showing a cross section of an exemplary waveguide cross section. In this example, only the monolayer regions, whose thickness is less than a nanometer and form the waveguide electrodes, are patterned.

Figure 2B:
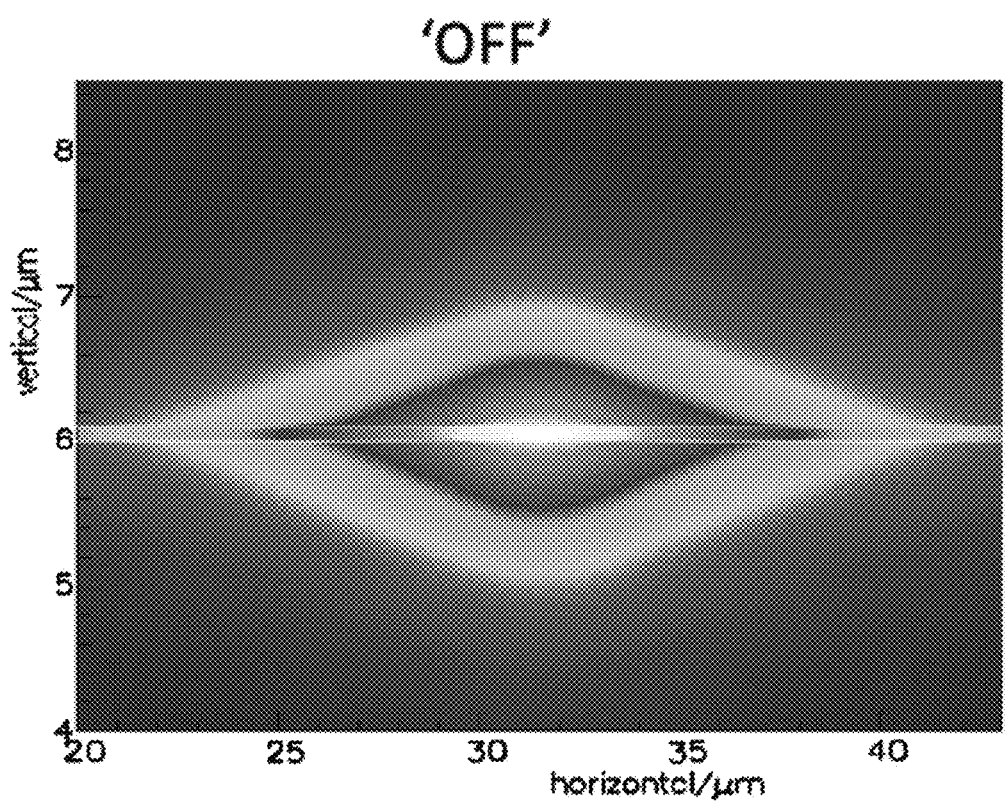
FIG. 2B is a graph showing a leaky slab mode when the field is off.

FIG. 2B is a graph showing a leaky slab mode when the field is off. When no voltage is applied across the capacitor, the mode is confined vertically by the slab and has almost no horizontal confinement (FIG. 2B). When we turn the voltage on, the $WS_2$ changes its index by ~1 and the refractive index of graphene changes and the graphene becomes transparent [3,4]. Other suitable slab materials include, for example, hafnium oxide or other high k dielectrics. The slab material can also be any suitable dielectrics with refractive index higher than an outer cladding (e.g. $SiO_2$, FIG. 2A).

Figure 2C:
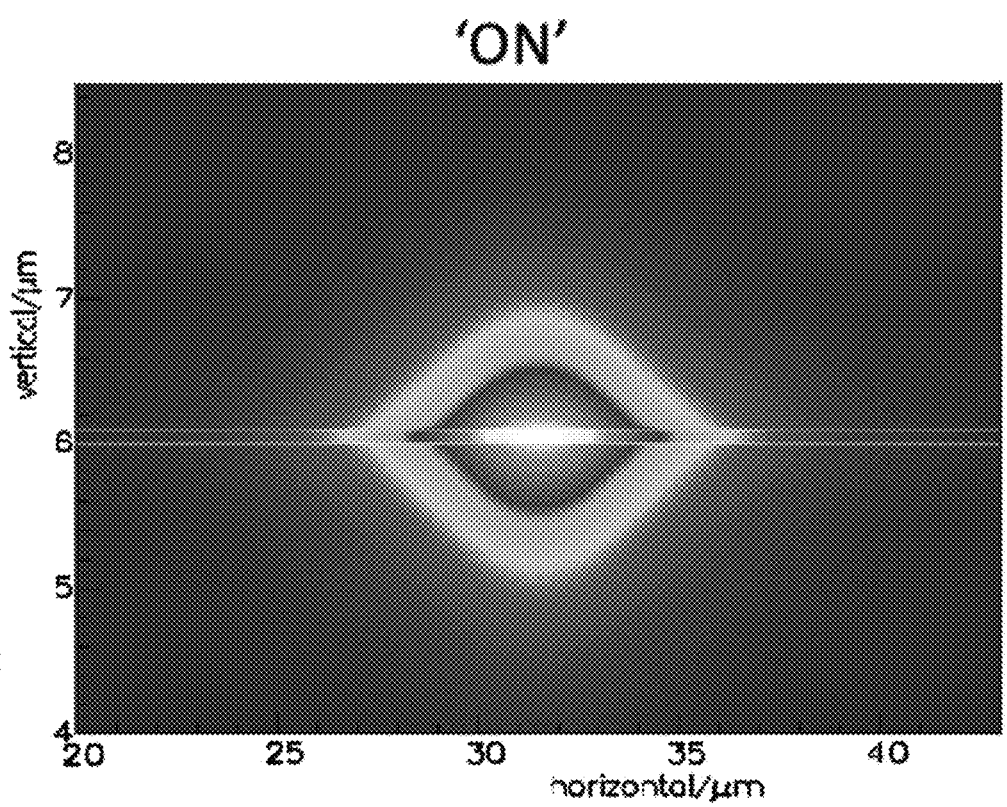

FIG. 2C is a graph showing a confined mode when the field is on. This increase in refractive index confines the mode in the horizontal direction while increasing the confinement in the vertical direction and forms the waveguide (FIG. 2C). When the electric field is turned off, the photonic structure disappears. This feature gives the platform enhanced security. Fundamentally, the device only consumes power when the capacitors are switched on, which makes the platform low power.

The general reconfigurable network includes an array of elements, or pixels, that can be activated to create waveguide segments. Each pixel is electrically isolated from the others to enable independent control (FIG. 1). The gap between pixels allows us to fit electrical vias to drive the electrodes. When we activate (i.e. apply a voltage) a series of pixels along a column, we form a waveguide with the length spanned by the pixels. The effective index of the waveguide mode depends on the applied voltage to form the waveguide. To change the relative phase between two waveguides we can apply slightly different voltages to each of them.

Any suitable voltage control can be used, practically between about −8 V to +8 volts, or 1 to 7 V. Typically 1 to 5 volts would be more common. A lower voltage of 1 to 2 volts can be used, particularly for higher speed operation.

The propagation constant (speed of light in the waveguide) is controlled as the effective index is set by the control voltage during gating (on/off operation of each pixel).

Example

A tunable power splitter can be made by activating multiple columns or rows of adjacent pixels along the coupling length required. The evanescent tail of the modes of adjacent waveguides couples the mode between rows of pixels. To form a full 2×2 power splitter, we envision using pixels in three adjacent columns (FIG. 1, bottom left panel). The pixels in columns one and three form the input and output waveguides. The pixels in the middle column, column two, couple the light from the left waveguide, one, to the right waveguide, three. Because the coupling strength depends on the coupling length and relative propagation constant between the coupled waveguides, we can control the coupling by varying the interaction length through the number of pixels or by changing the effective index of the waveguide modes in the coupling region.

The programmability of the proposed platform enables a 2×2 spatial switch. By applying a similar configuration to the 2×2 power splitter, we can program a 2×2 switch (FIG. 1 bottom right panel). The switch includes activated pixels in three adjacent columns. The left most and right most columns serve as the input/output ports of the switch. In the middle column we activate the pixels so that we have full transfer of power when the switch is activated. When the switch is off, light in the ports will go straight through (stay in its current path). When the switch is on, light will switch waveguides: bottom left input will output at top right; top left input will output at bottom right; and similarly, for the other combinations.

By combining the basic structures of waveguides, 2×2 power splitters, and switches, a programmable integrated photonic network can be created. For example, combining two tunable 2×2 splitters forms a Mach-Zehnder interferometer which can be used for signal processing, wavelength routing, advanced modulation and demodulation of signals, photonic neural networks, and path entanglement of individual photons. A bank of ring resonator cavity filters can be placed on the phoFPGA layout and accessed through the programming by controlling the routing of light.

The exemplary phoFPGA platform is compatible with CMOS manufacturing and is scalable to multilayer, 3D photonics. The materials in the exemplary platform are based on graphene and transition metal dichalcogenides, which have been shown compatible with back end of the line CMOS manufacturing [5,6]. Because the layers of the platform are deposited and/or transferred, multiple programmable photonic layers can be stacked to form programmable 3D photonic networks. The fabrication process of the proposed platform can be implemented in a foundry process enabling a near term path to access the technology using existing manufacturing techniques. The ability to use the vertical dimension to increase the number of programmable elements in the photonic network ensures scalability to more complex systems.

We now describe the following aspects of a lithography-free integrated photonic FPGA according to the Application: 1—methodology for an arbitrarily programmable integrated photonic device and determine fundamental limits of the technology; 2—basic components of the phoFPGA platform; and 3—a fully programmable photonic network based on the described platform.

Part 2—Integrated Photonic FPGA: Design Methodology and Fundamental Limits

To address the challenge of designing photonic devices and networks with the described lithography-free platform, a design methodology based on multiphysics simulations of individual components of the phoFPGA platform and modeling each component with an equivalent matrix can be used. Such code can be used to simulate complex devices and networks using the generated matrices from each of the components. The design methodology can be guided by an understanding of the fundamental limits of the proposed technology.

The waveguides of the proposed platform are created when an electric field is applied across a capacitor, such as a capacitor built with transition metal dichalcogenide (TMDC) monolayers. To get an accurate representation of the optical mode and its properties, the electric field generated across the capacitor can be simulated using commercial Finite Element Modeling software (e.g. COMSOL, available from COMSOL, Inc., Burlington, MA) and the simulated field can be used to calculate the refractive index profile of the waveguide core. With the refractive index profile, the supported mode profile can also be simulated. Preliminary simulations, which model the waveguide structure as a simple parallel plate capacitor, show a well confined mode is supported (FIG. 2C). When the voltage is off, the supported mode is a slab mode which is not well confined in the horizontal direction and absorbs quickly into the un-gated graphene. The applied voltage increases the refractive index of the TMDC monolayer of tungsten disulfide ($WS_2$) [4] from 2.75 to 3.75 and reduces the graphene mode loss from 40 dB/cm to 1.7 dB/cm, which confines the mode in both the horizontal and vertical directions. The resulting mode is well confined and has low loss. The waveguide modeling can be extended with an accurate calculation of the refractive index profile.

Figure 3:
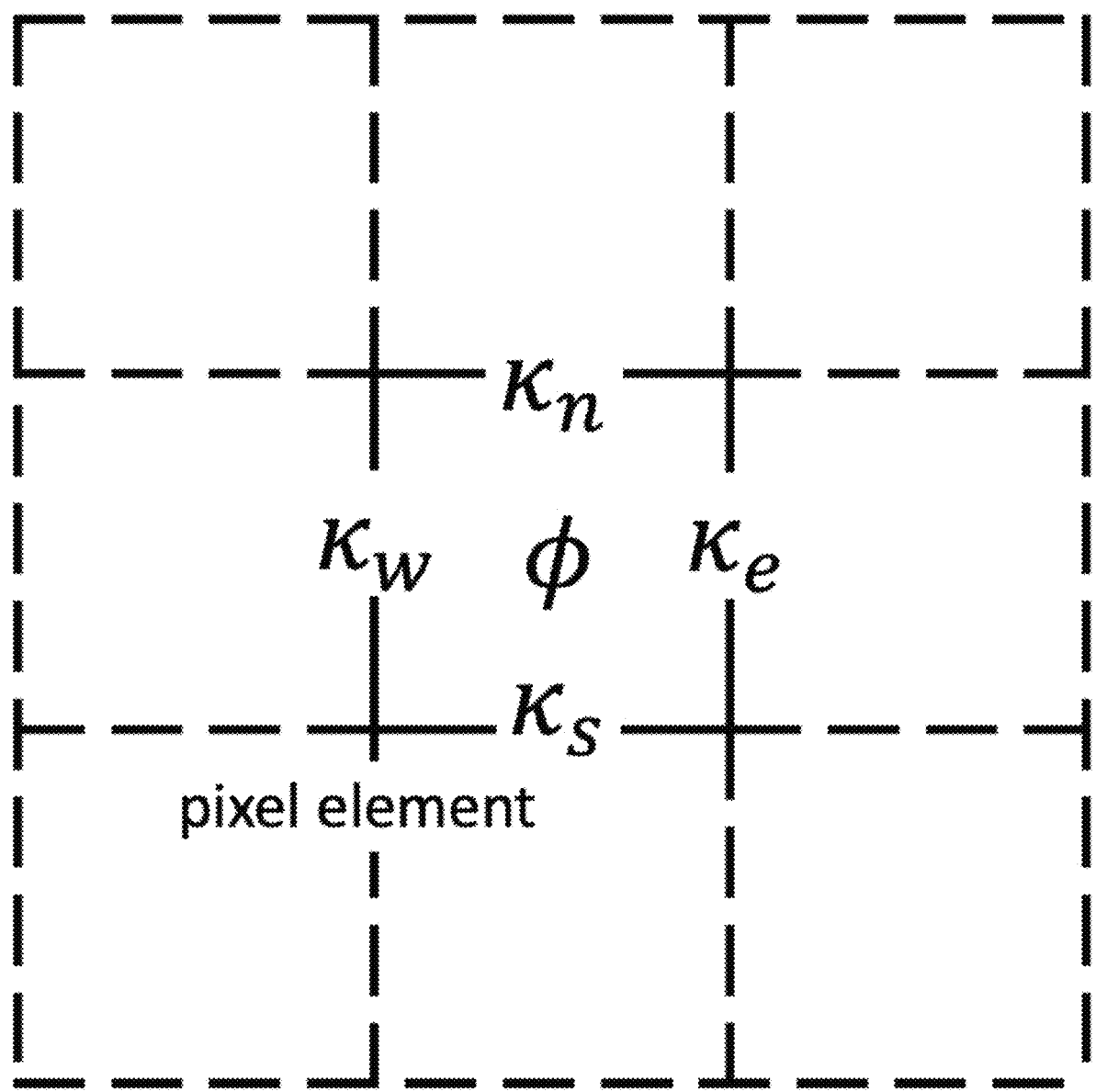
FIG. 3 is a drawing showing a representation of a pixel of a photonic field programmable gate array (phoFPGA) as a parametrized element: coupling (top/bottom) evanescent interaction (left/right), and accumulated phase.

Simulation tools can also be extended by extracting parameters from the component simulations to abstractly represent the pixels and code can simulate a full phoFPGA photonic network. FIG. 3 is a drawing showing a representation of a pixel of a phoFPGA as a parametrized element: coupling (top/bottom) evanescent interaction (left/right), and accumulated phase. Each pixel or set of pixels can be represented by an abstract matrix representation composed of five terms: the input and output complex coupling, the acquired phase propagating through the pixel, and the evanescent coupling to the two adjacent pixels (FIG. 3). By multiplying the matrices, we can calculate the output of a complex network. An algorithm can be used to simulate an arbitrary set of activated pixels and to calculate the output of each of the pixels located on the periphery of the phoFPGA.

Fundamental limits and trade-offs of the proposed platform can also be calculated. The electrical power consumption from activating the pixels can be calculated and the device geometry can be optimized to minimize electrical power consumption from activating the pixels. The fundamental limit to switching the pixels on and off can also be calculated. The fundamental waveguide loss limit and the trade-off between number of pixels and waveguide loss can also be calculated.

Part 3—Integrated Photonic FPGA Platform Basic Components

The basic components of the phoFPGA platform include, for example, waveguides, directional couplers, tunable power splitters, tunable attenuators, modulators, waveguide bends, pixel connectors, and 2×2 switches. These components can serve as the building blocks for a programmable photonic network demonstration. These components can perform the basic functions needed to build a programmable photonic network.

Photonic waveguides based on the phoFPGA pixel technology can be made using the lithography-free integrated photonic FPGA according to the Application. Waveguide loss can be characterized by fabricating pixel elements of different lengths with the same number of pixel connectors to extract the propagation loss of the waveguides. To extract the loss, we can measure the optical power throughput of the different waveguides and plot the power in dBm vs. the waveguide length. The slope of the curve is equal to the propagation loss and the y-intercept is the coupling loss. Similar experiments can be run to measure the pixel connector loss. To extract the pixel connector loss, waveguides of equal length with a different number of pixel connectors can be fabricated and the loss per connector determined by use of a similar plot. The measured waveguide and connector loss can be used to enhance and improve waveguide modeling. Waveguide geometry can be optimized to minimize waveguide loss.

Waveguide bends can be used to change the direction of light propagation. Waveguide bends can occur within a pixel and route light that is input in the North/South (up/down) direction to the East/West (left/right) direction. The minimum bending radius before bending loss becomes the dominant loss mechanism depends on the waveguide confinement. Waveguides can be fabricated with different number of bends to extract the bending loss. This process can be repeated for different bending radii. To extract the bending loss from the experimental measurements, the number of pixel connectors and the waveguide length can be made equal while changing the number of bends. The characterized waveguide and connector loss can also be used to calculate the bend loss.

The directional coupler or power splitter is an important component in an integrated photonic platform. Tunable power splitters can be made by using groupings of adjacent pixels. By activating two horizontally adjacent (perpendicular to direction of propagation) pixels light will couple from one waveguide to the other. Note that each activated pixel is a waveguide element. To terminate the coupling between the waveguides, a three-waveguide arrangement can be used. A waveguide bend at the end of the coupling region can also be used to separate the waveguides and stop the coupling.

Figure 4A:
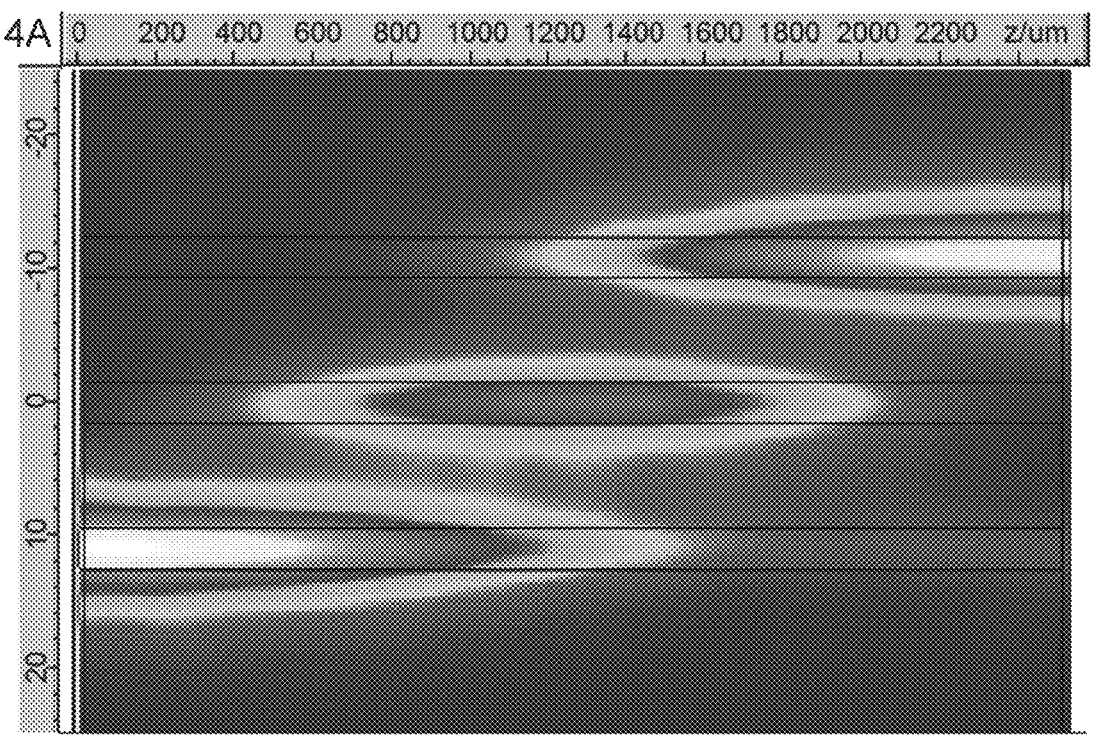
FIG. 4A is a graph showing a simulated coupling for an exemplary power splitter (or a switch) for three rows of activated pixels showing 100% coupling from bottom to top waveguide after 2500 μm.
Figure 4B:
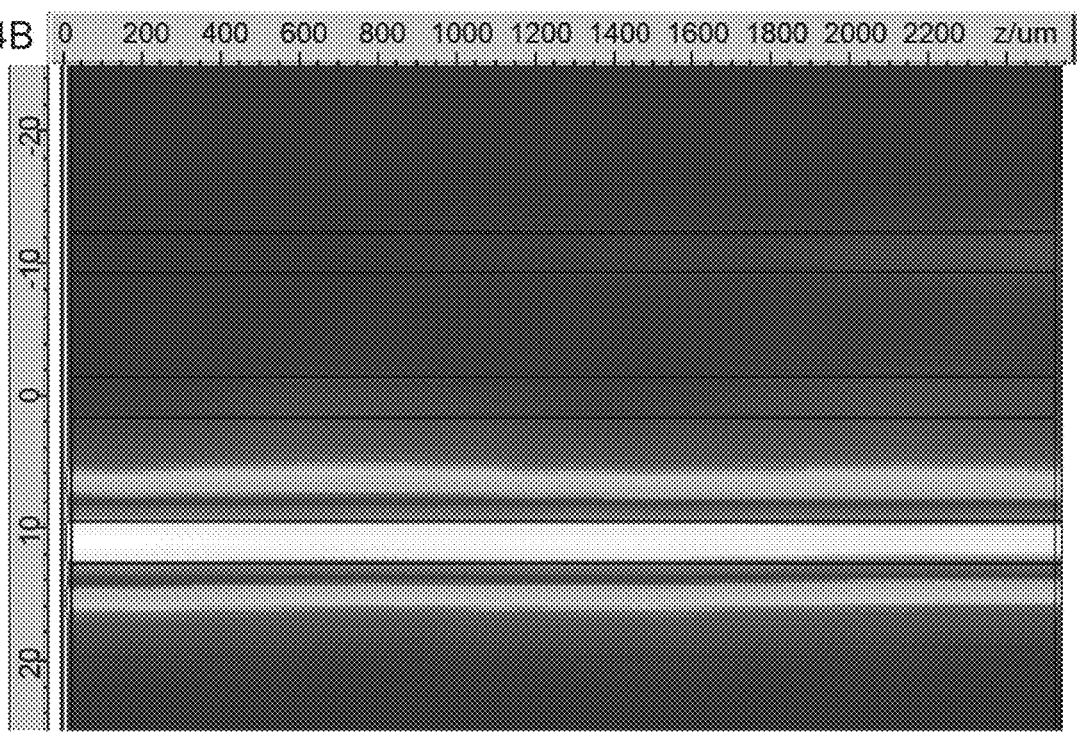
FIG. 4B is a graph showing a simulated coupling for an exemplary power splitter (or a switch) where the middle row of pixels is switched off the power stays in the original waveguide.
Figure 4C:
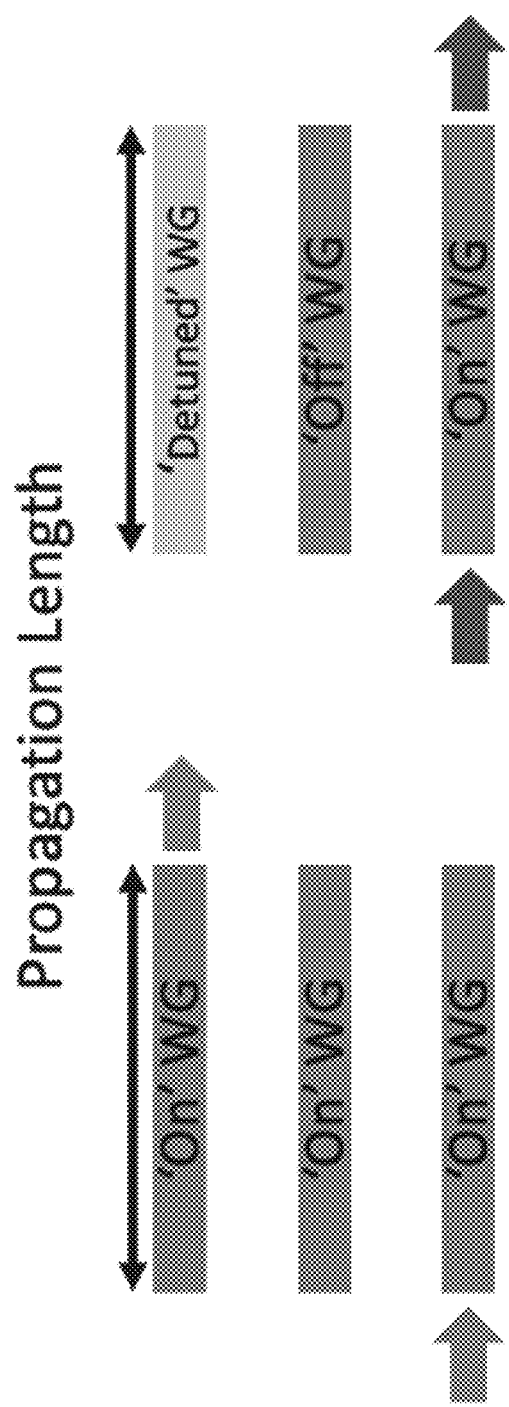
FIG. 4C is a drawing showing a schematic for an exemplary of activated pixels in the switching and pass-through states.
Figure 4D:
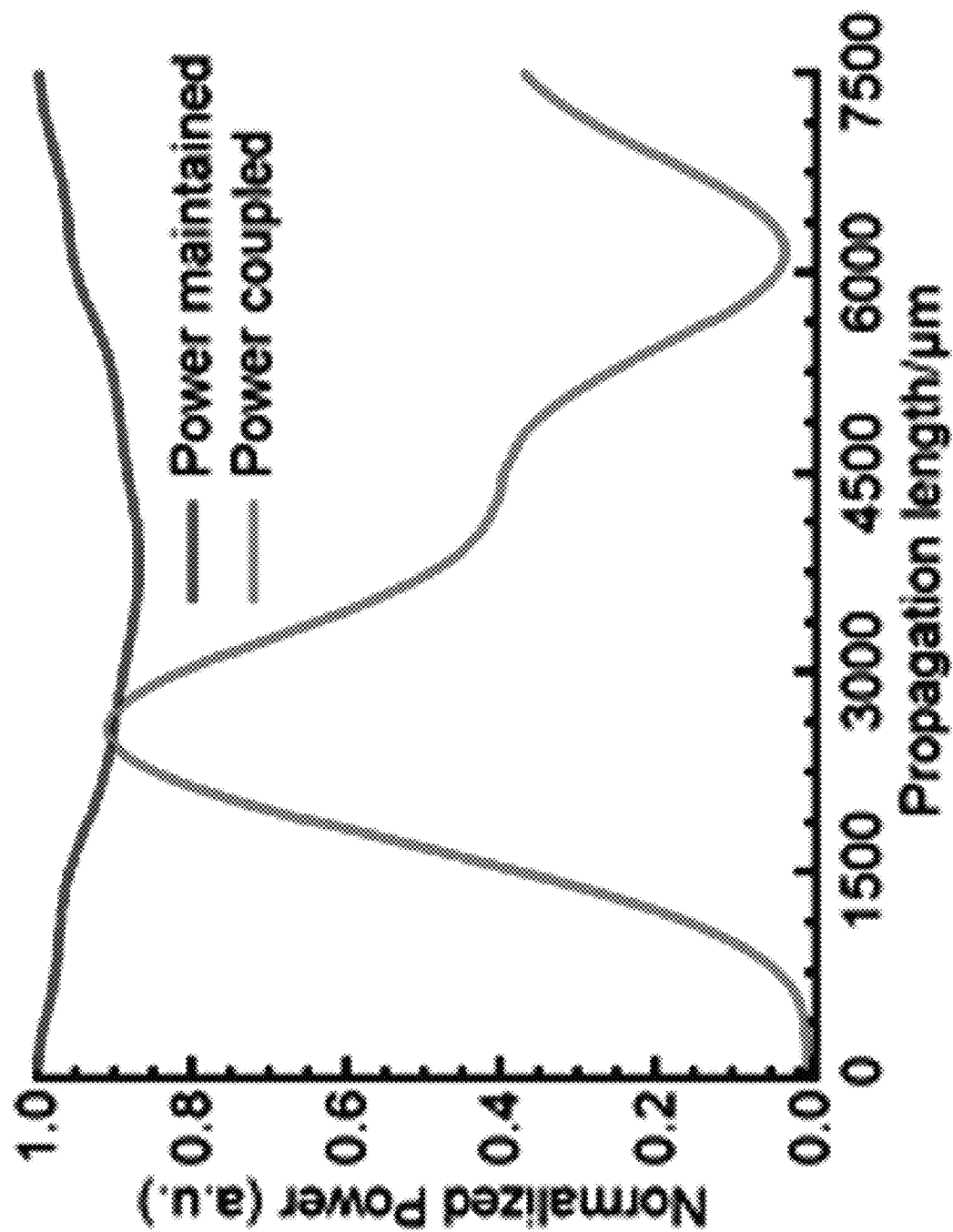
FIG. 4D is a graph showing a calculated output power for an exemplary for the 'ON' (top curve) and 'OFF' (bottom curve) states.
Figure 4E:
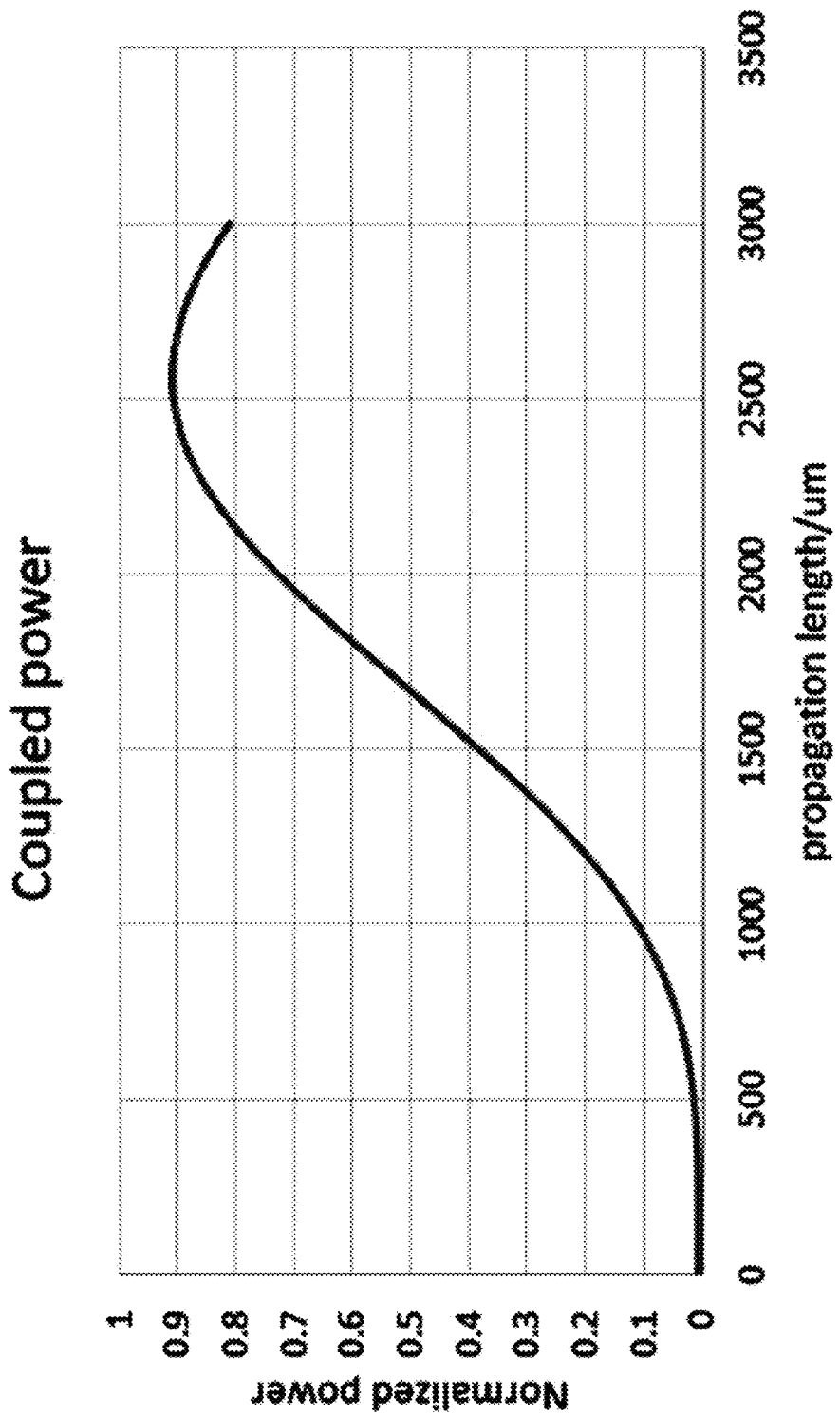
FIG. 4E is a graph showing the bottom curve of FIG. 4D in more detail from 0-3000 μm.
Figure 4F:
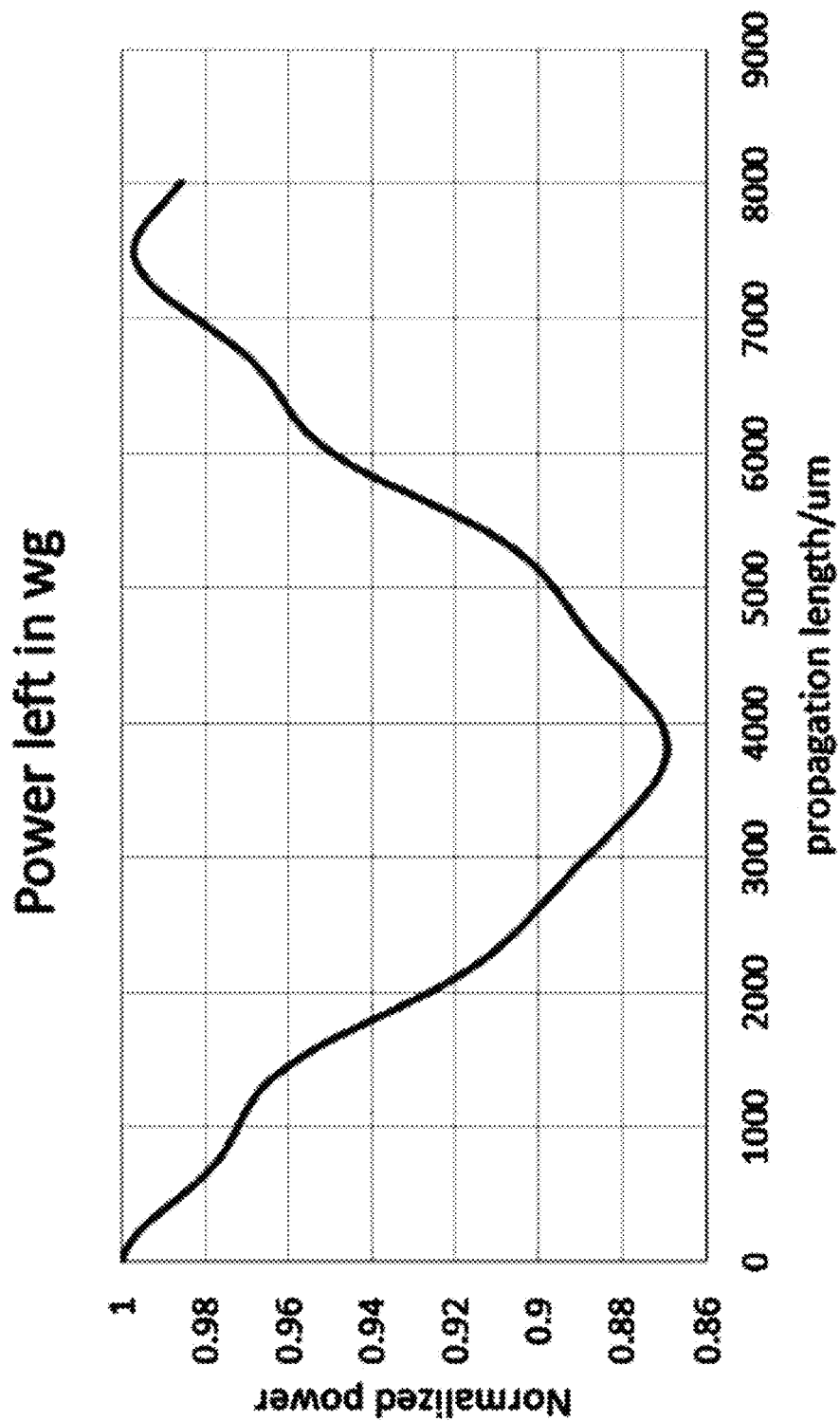
FIG. 4F is a graph showing the top curve of FIG. 4D in more detail from 0-8000 μm.

FIG. 4A to FIG. 4D show preliminary simulations of a directional coupler with a coupling length of 2500 μm and a pixel connector with a loss of 0.04 dB/connector. FIG. 4A is a graph showing a simulated coupling for an exemplary power splitter for three rows of activated pixels showing 100% coupling from bottom to top waveguide after 2500 μm. FIG. 4B is a graph showing a simulated coupling for an exemplary power splitter where the middle row of pixels is switched off and the power stays in the original waveguide. FIG. 4C is a drawing showing a schematic for an exemplary of activated pixels in the switching and pass-through states. FIG. 4D is a graph showing a calculated output power for an exemplary for the passing through (top curve) and switching (bottom curve) states. The splitting ratio can be tuned by changing the applied voltage to each waveguide row. FIG. 4E is a graph showing the bottom curve of FIG. 4D in more detail from 0-3000 μm. FIG. 4F is a graph showing the top curve of FIG. 4D in more detail from 0-8000 μm.

The pixel length and number of pixels involved in the power splitter can be set to obtain 50:50 and 0:100 power split when both waveguides are identical. The power coupling can be tuned by slightly changing the propagation constant of one of the coupled waveguides to slightly mismatch it with respect to the other one. By tuning the phase matching between the waveguides, the power splitting ratio of the coupler can be controlled. The waveguide geometry (i.e. slab material and thickness, and two-dimensional material width) can be set to minimize the bending radius and coupling length. A programmable photonic network can be made by configuring the 0:100 power splitter into a 2×2 spatial switch. Switching time and crosstalk can be characterized. The pixel length, which sets the capacitance, and the contact resistance can be optimized to realize switch times <1 ns.

Part 4—Programmable Photonic Network

A programmable photonic network can be made using a lithography-free integrated photonic FPGA according to the Application, such as, the exemplary phoFPGA structures. A phoFPGA for digital modulation can be used to make a 4×4 switch based on the Benes architecture [7,8]. Additionally, the waveguide confinement can be increased by stacking multiple layers of two-dimensional materials separated by thin (10-20 nm) dielectric layers. Such layering can increase the mode overlap with the two-dimensional materials and increase the mode confinement. Increased confinement can lead to shorter devices and lower insertion loss.

Amplitude Modulator—High speed optical modulation can be accomplished by turning a waveguide on and off rapidly.

Figure 5A:
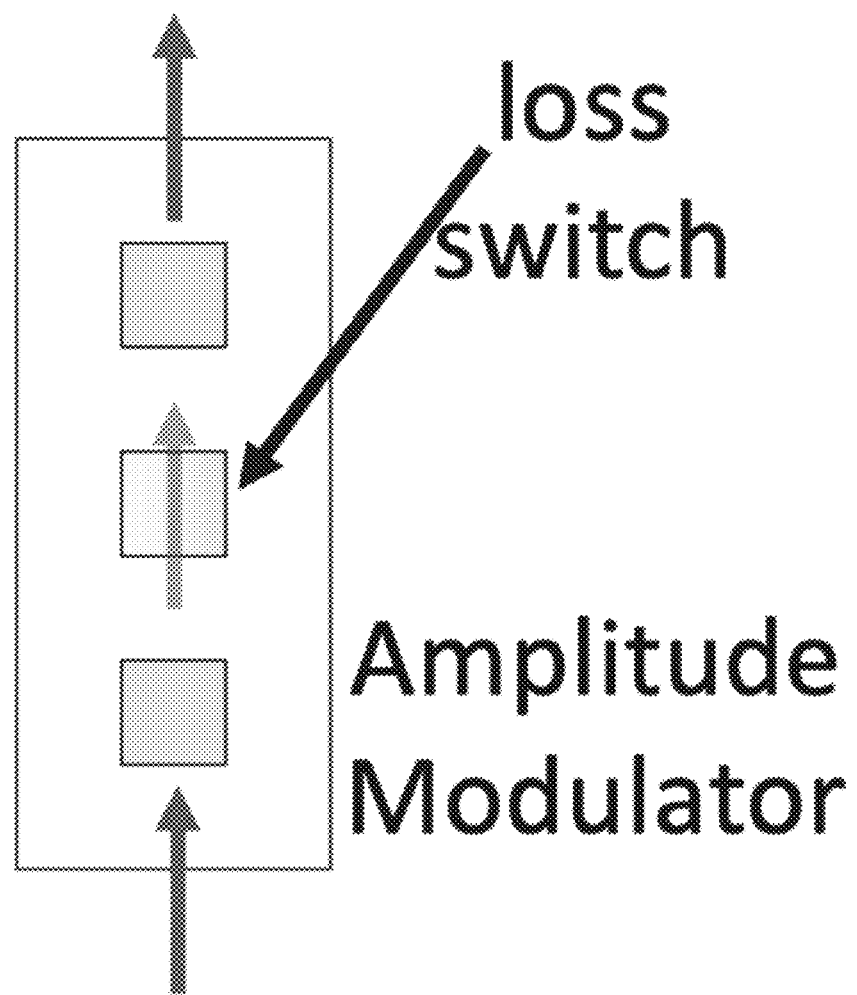
FIG. 5A is a drawing showing a schematic for an exemplary amplitude modulator.
Figure 5B:
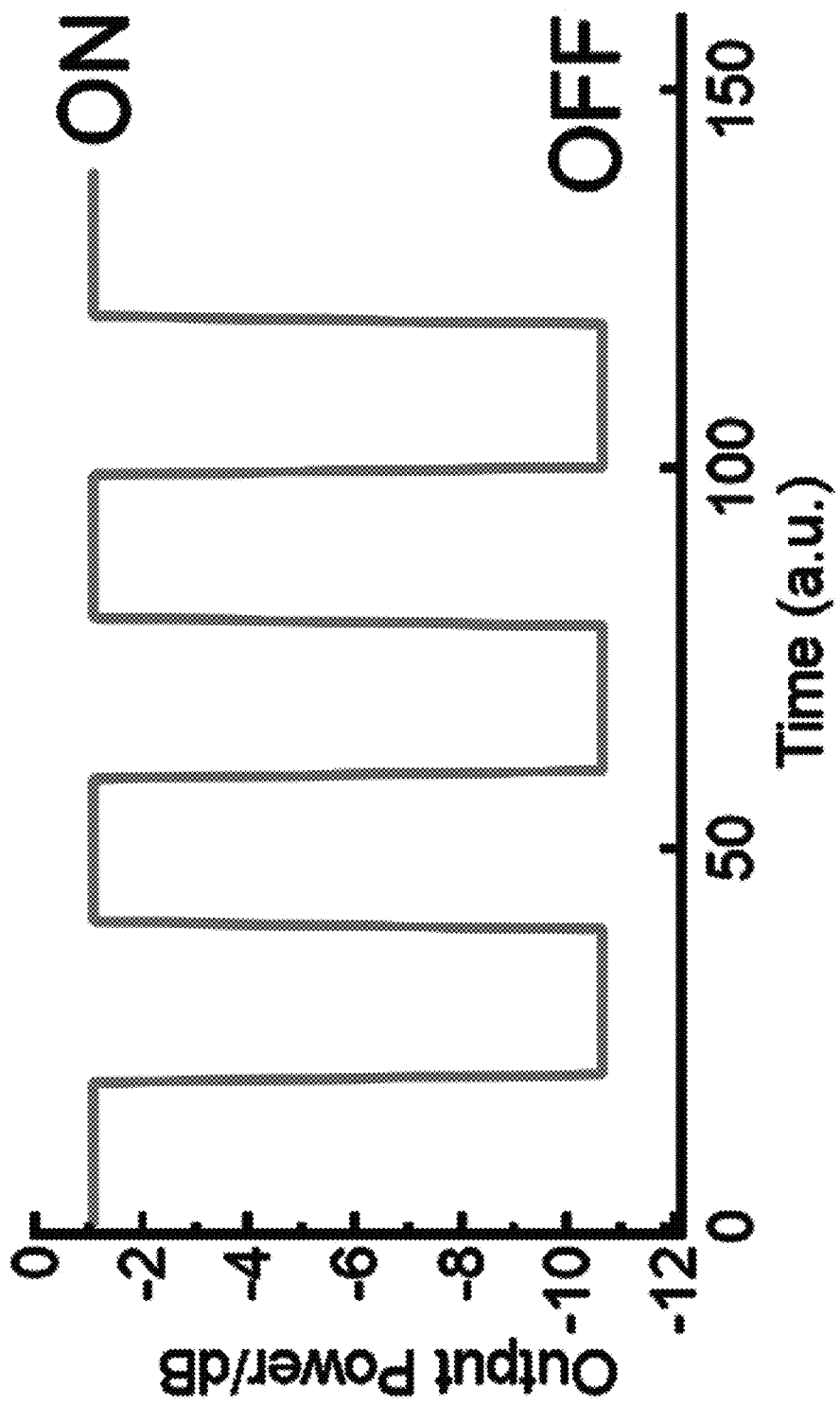
FIG. 5B is a graph showing a calculated output of a modulator with an extinction ratio of 9 dB and 1 dB insertion loss for a 2500 μm long device.
Figure 5C:
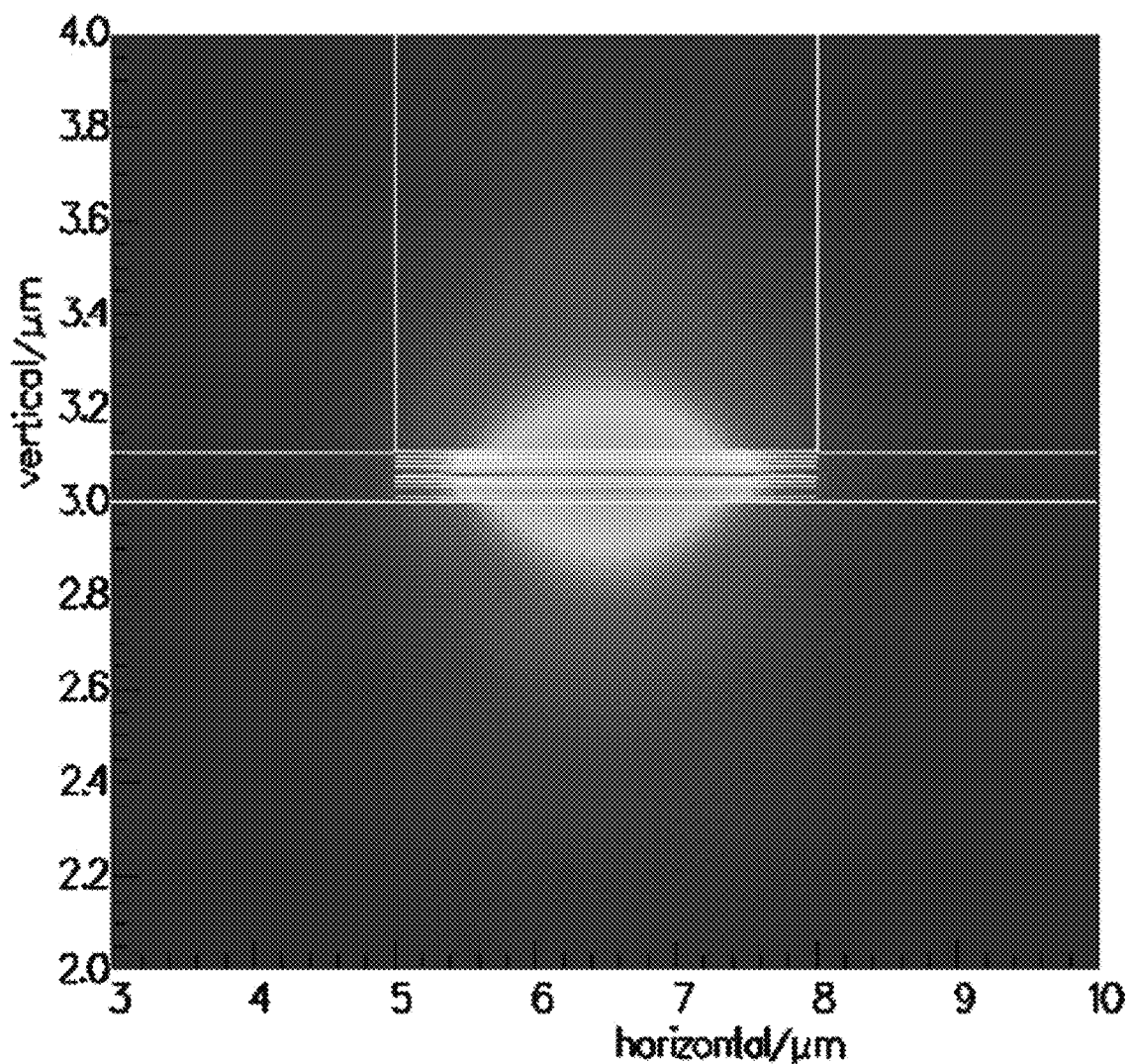
FIG. 5C is a graph showing a simulated mode profile for a layered cross-section with 10 layers of $WS_2$ showing strong mode confinement.

FIG. 5A to FIG. 5C show an exemplary amplitude modulator according to the Application. FIG. 5A is a drawing showing a schematic for an exemplary amplitude modulator. FIG. 5B is a graph showing a calculated output of a modulator with an extinction ratio of 9 dB and 1 dB insertion loss for a 2500 μm long device. FIG. 5C is a graph showing a simulated mode profile for a layered cross-section with 10 layers of $WS_2$ showing strong mode confinement.

To enable fast switching of the waveguide from the on to the off state, the pixel length can be optimized, which drives the resistance and capacitance down, and drive the series of pixels in unison. When the waveguide is on, the modulator has a high transmission (i.e. a "1") while it has a low transmission (i.e. a "0") when the waveguide is off. Modulation speeds of at least 10 Gbps are possible by use of the lithography-free integrated photonic FPGA according to the Application.

To increase scalability of the exemplary phoFPGA platform, waveguides with a cross-section of layered two-dimensional materials can be made. The cross-section can include layers of two-dimensional materials (graphene and TMDCs) separated by thin dielectric layers (10-20 nm) (FIG. 5C). The optimum thicknesses can be determined using the modeling platform. The layering increases the optical mode interaction with the refractive index change of the two-dimensional materials resulting in a more confined optical mode when the waveguide is switched on. The stronger confinement will lead to shorter directional couplers and more compact waveguide bends. The increased confinement will enable shorter devices with more programmable elements.

A programmable photonic network by implementing a 4×4 optical switch in the phoFPGA platform can be made using the lithography-free integrated photonic FPGA according to the Application. The 4×4 switch can be based on the Benes architecture using six 2×2 switches [7, 8]. 2×2 switches can also be programmed into the phoFPGA platform. U-turns into the phoFPGA can be used to connect the 2×2 switch ports. Insertion loss, bit error rate, power penalty, crosstalk, and reconfiguration time of the switch with 25 Gbps data generated externally can be characterized. Switch with modulators can be integrated into a full programmable network implementation.

Part 5—Tunable Waveguide Element and 2×2 Switch Arrays with Curved Waveguides

Using the waveguide pixel approach described hereinabove, a 2×2 switch typically occupies three columns of 5 waveguide pixels for a footprint of 15 pixels. Optically, the switchable coupler only uses three waveguide pixels, with 13 of the 15 pixels of the footprint used for a 2×2 switch.

Either in addition to, or in place of waveguide pixels, we realized a more space efficient 2×2 switch with curved waveguides. Tunable waveguides with a new tunable waveguide structure are now described. The Tunable waveguides operate on a principle somewhat similar to the waveguide pixels described hereinabove. On difference is that where turns were approximated above by orthogonal pixels, now there can be curved waveguides. Adjacent curved waveguides can be tuned to share light or to not share light, thus providing configurable devices, such as, for example 2×2 switch elements. As a subset of tunable, the 2×2 switch can have a Boolean on off control. However, continuous tuning over a range of shared light between on and off is also available.

Figure 6A:
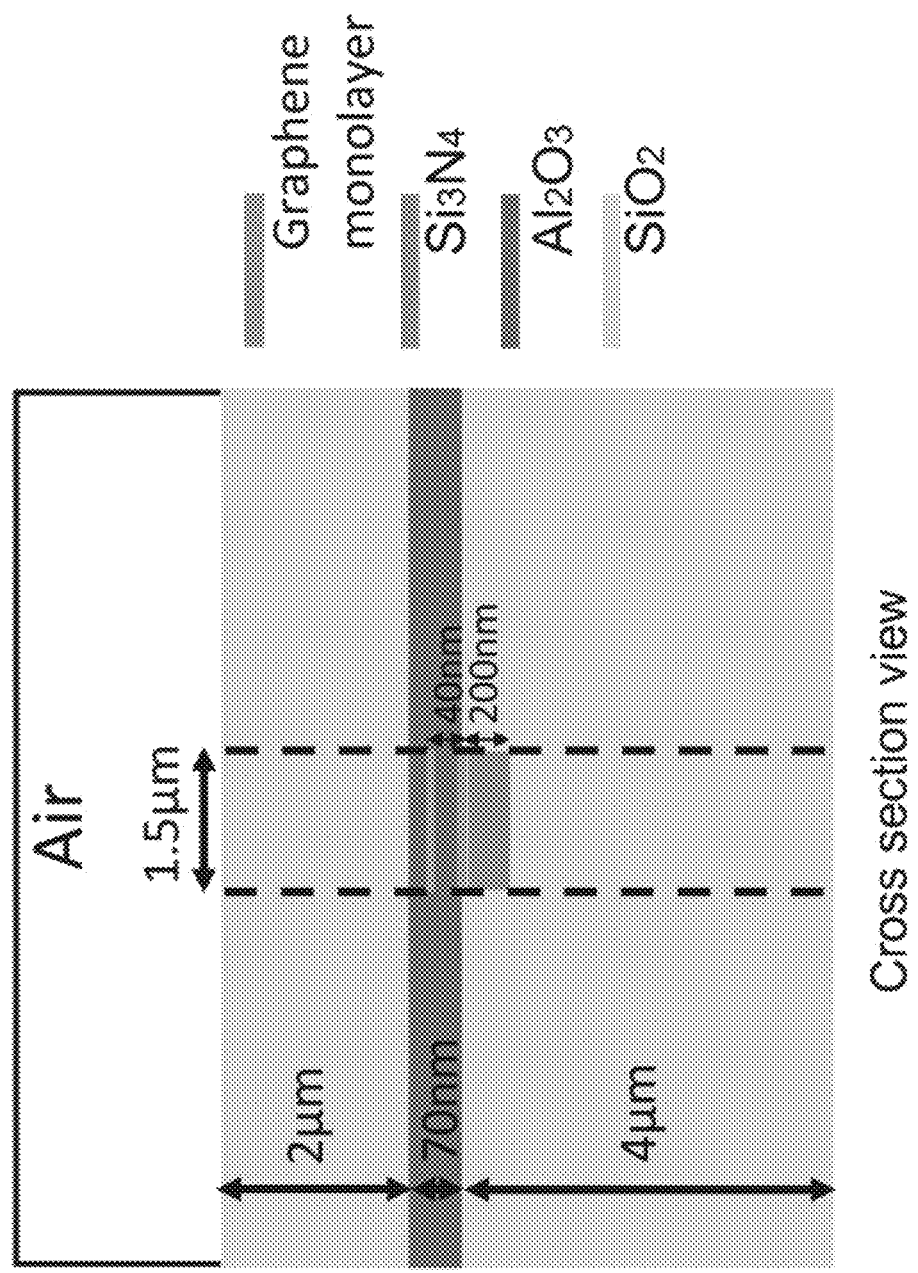
FIG. 6A is a drawing showing a cross section view of a new waveguide structure according to the Application.
Figure 6C:
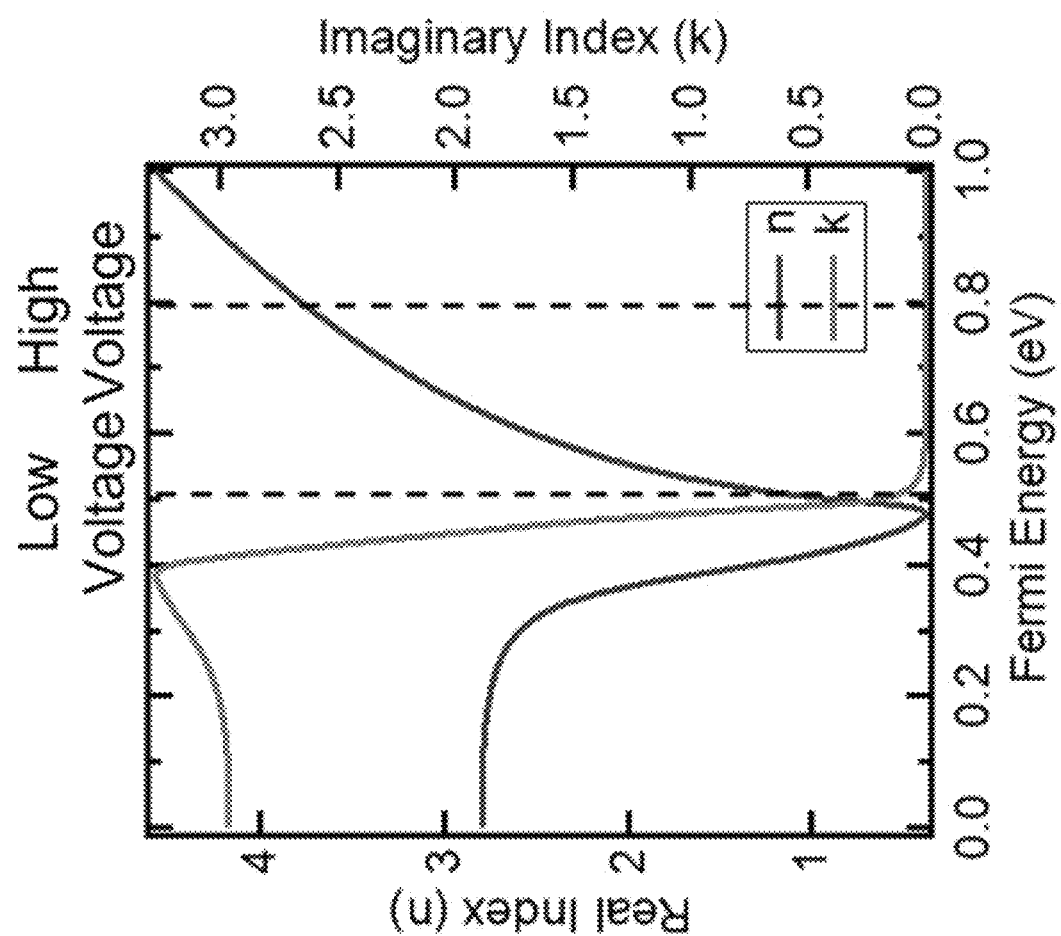
FIG. 6C is a drawing showing a graph of the real and imaginary index of graphene monolayer as a function of its Fermi Energy.
Figure 6B:
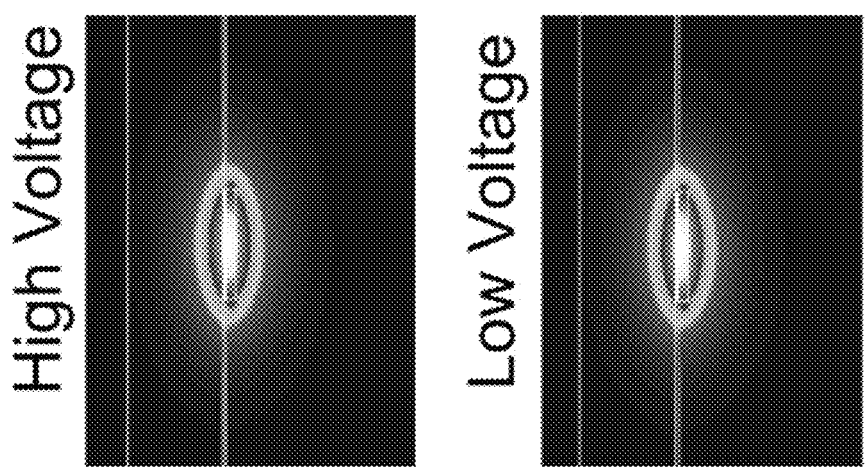
FIG. 6B is a drawing showing a field profile of optical modes with high and low voltage applied between two monolayers.

FIG. 6A is a drawing showing a cross section view of the new waveguide structure of Part 5 of the Application. The cross section view shows an end on view of a waveguide width and height, the length of the waveguide extending into the page. The exemplary integrated planar system is shown under air and disposed within $SiO_2$. All dimensions which follow are exemplary dimensions. Disposed about 2 μm below the $SiO_2$ surface there is an about 70 nm thick $Al_2O_3$ layer. Disposed in and on the $Al_2O_3$ layer are two or more pads or strips of about a graphene monolayer, here spaced apart by about 40 nm. The waveguide which extends into the page is provided by about a 200 nm high $Si_3N_4$ waveguide. A portion of each of one or more, typically two adjacent waveguides is controlled by the graphene monolayer pads or strips as electrodes. FIG. 6B is a drawing showing a field profile of optical modes with high and low voltage applied between two monolayers. FIG. 6C is a drawing showing a graph of the real and imaginary index of graphene monolayer as a function of its Fermi Energy, which in this exemplary case, is proportional to square root of absolute value of applied voltage between two monolayers.

Figure 6D:
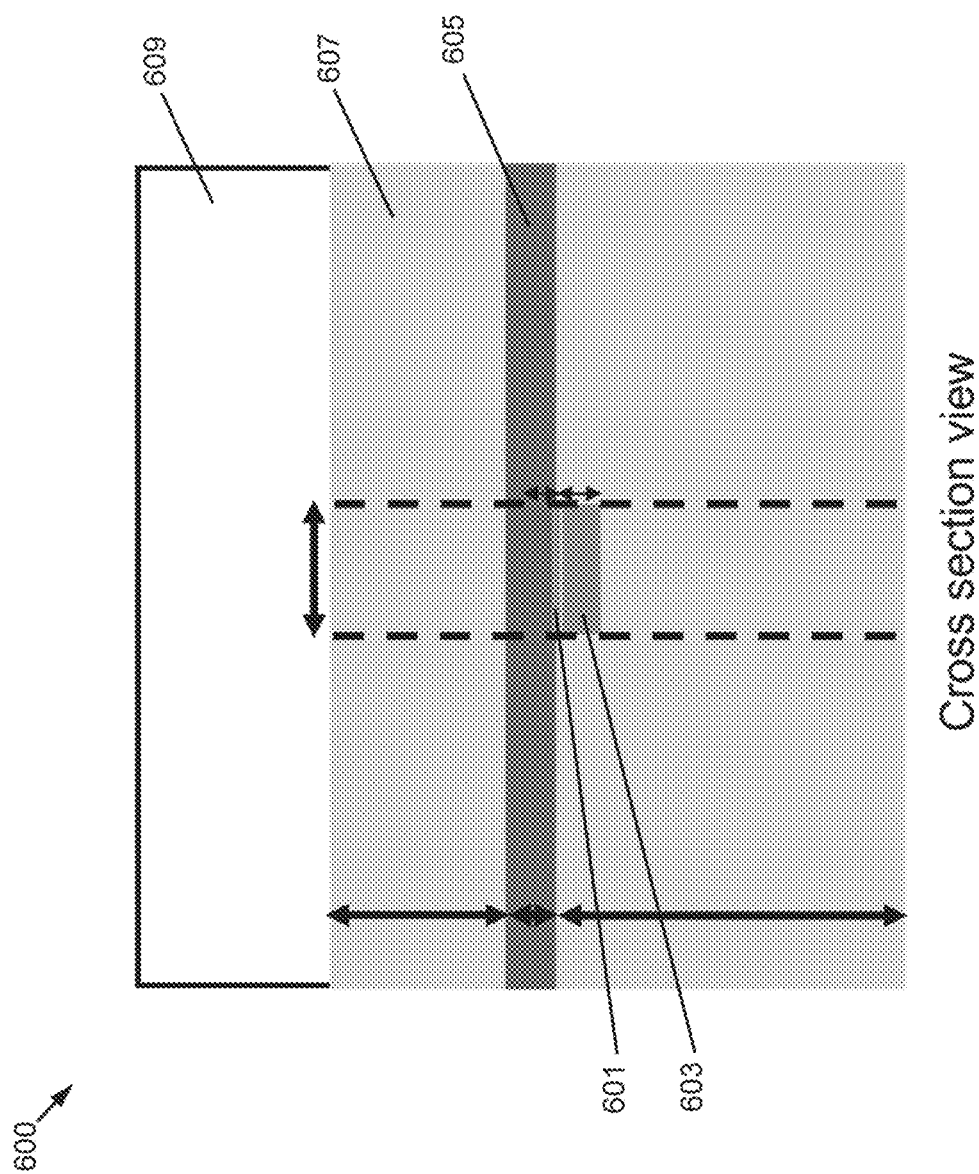
FIG. 6D is a drawing showing a generalized exemplary waveguide structure according to Part 5 of the Application.

FIG. 6D is a drawing showing a generalized exemplary waveguide structure 600 according to Part 5 of the Application, where FIG. 6A is merely but one exemplary structure. The structure is shown below a cross section 609 which is typically air, however can be, for example, a vacuum, air, inert gas, etc. Waveguide 603 is tuned by a two dimensional monolayer pad 601. Waveguide 603 is disposed adjacent to a high k dielectric. Two dimensional monolayer pad 601 is disposed on or in the high k dielectric 605 adjacent to a portion of waveguide 603. Two dimensional monolayer pad 601, waveguide 603, and high k dielectric 605 are disposed in a cladding 607.

Cladding 607 is typically a $SiO_2$ cladding. Waveguide 603, also referred to as a waveguide core or guiding layer, can be made of any suitable waveguide material. Waveguide 603 can be, for example, a dielectric, semiconductor, or a polymer. Suitable waveguide materials include, for example, silicon nitride ($Si_3N_4$), silicon, glass, polymers, lithium niobite, lithium tantanate, aluminum oxide, silicon carbide, etc. Waveguide 603 typically has a higher refractive index than the cladding (the cladding is typically $SiO_2$). Two dimensional monolayer pad 601 can be a flake or a continuous layer. Two dimensional monolayer pad 601 can be made with any suitable monolayer material, such as, for example, a graphene monolayer or a transition metal dichalcogenide monolayer.

In electrical operation, the two dimensional monolayer pad 601 can be viewed as an electrode. Any suitable integrated structures can be used to couple a voltage to the two dimensional monolayer pad 601 (not shown in the views of the tunable waveguide element or the integrated 2×2 array element). In electrical operation, a single two dimensional monolayer pad 601 can be charged with respect to a substrate on which the tunable waveguide element can be disposed. Alternatively, there can be at least one additional two dimensional monolayer pad so that one pad is charged by a voltage with respect to the other pad. Similarly, there can be N additional two dimensional monolayer pads beyond two.

Figure 7:
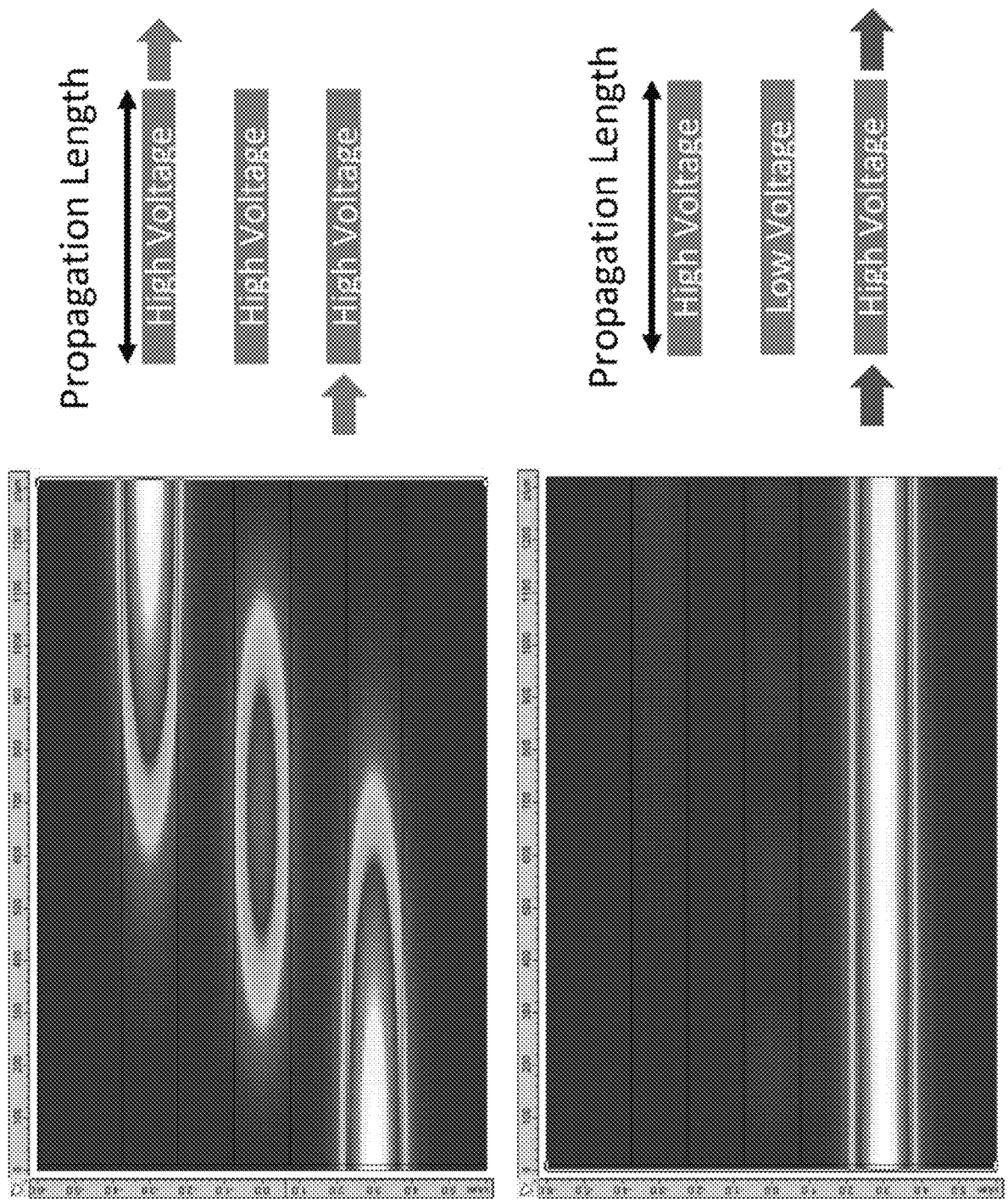
FIG. 7 is a drawing showing simulation results of the coupling region for the new waveguide design of FIG. 6A.

FIG. 7 is a drawing showing simulation results of the coupling region for the new waveguide design of FIG. 6A.

In summary of the generalized example of FIG. 6D, an integrated tunable waveguide element 600 includes: a cladding 607. A high k dielectric layer 605 is disposed within the cladding 607. At least one waveguide 603 is disposed adjacent to the high k dielectric layer 605. At least one two dimensional monolayer pad 601 is disposed on or in the high k dielectric layer 605 adjacent to a portion of the at least one waveguide 603.

Using the new waveguide design for a new array design—As described hereinabove, the optic mode in the pixel waveguide approach is weakly confined and it does not allow turning of waveguide. As a result, the horizontal gap between two adjacent pixels should be kept the same everywhere.

By contrast, the new tunable waveguide design with silicon nitride core has a much more confined optic mode and allows for a relatively sharp turning (radius 100 μm or less) without significant loss. Therefore, we now have more freedom in device design and can spare much more space for electrodes arrangement by turning the waveguide.

Figure 8B:
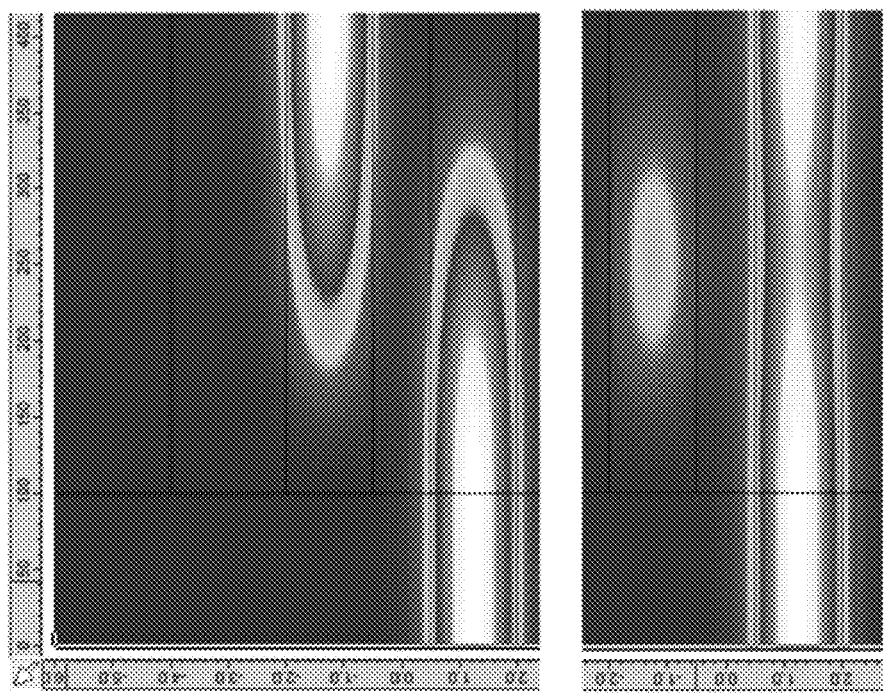
FIG. 8B is a drawings showing simulation results of 100% coupling (up) and 0% coupling (down) of the tunable switch.
Figure 8A:
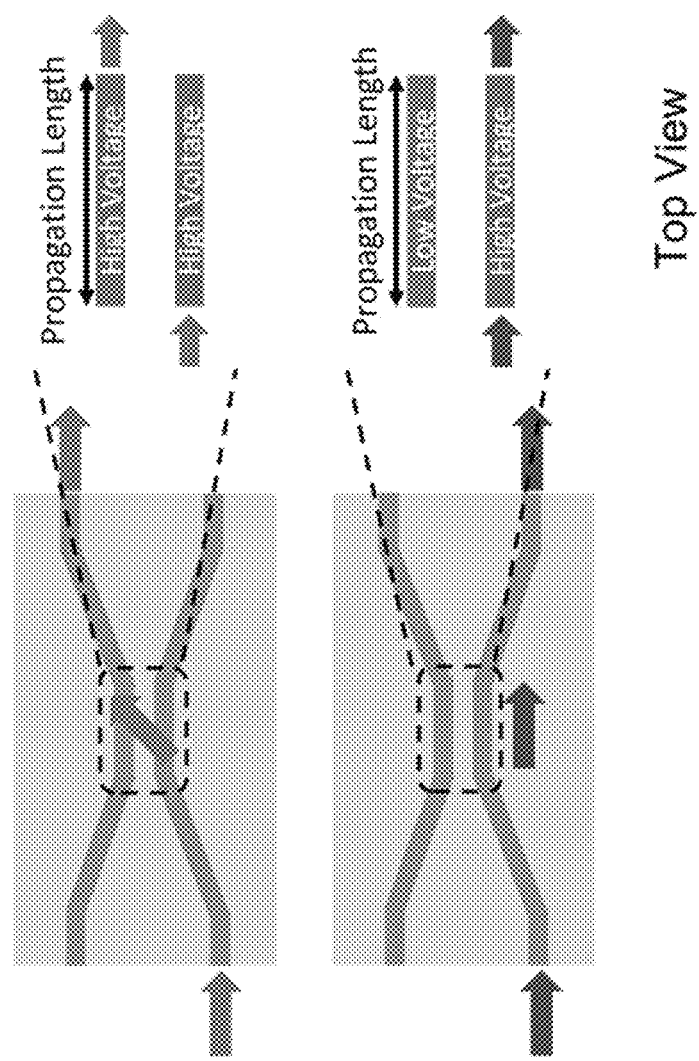
FIG. 8A is a drawings showing a top view of an exemplary 2×2 tunable switch based on the new waveguide structure.

FIG. 8A is a drawings showing a top view of an exemplary 2×2 tunable switch based on the new waveguide structure. FIG. 8B is a drawings showing simulation results of 100% coupling (up) and 0% coupling (down) of the tunable switch.

As shown in FIG. 8A, two waveguides only need to be close to each other in the coupling region. With this new structure, another type of 2×2 tunable switch can be made available in a phoFPGA platform as an elemental block of the new FPGA design. There can be switching between light coupling between both waveguides (both waveguide electrodes at high voltage) and substantially no light couples between waveguides (one electrode at high voltage and one electrode at low voltage) power coupling as shown in FIG. 8B.

Figure 9:
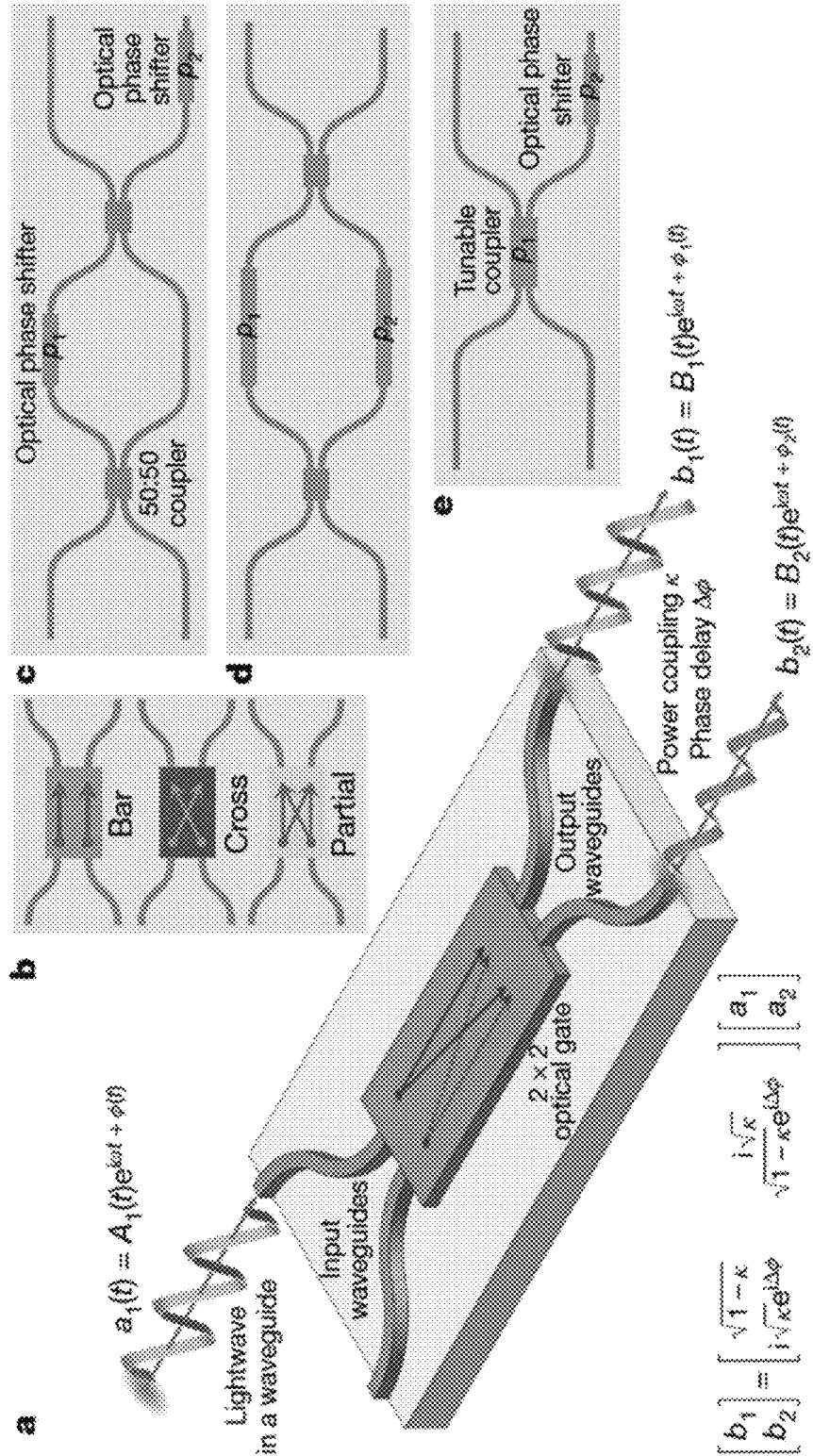
FIG. 9 is a drawing showing how a prior art concept of a 2×2 tunable switch and typical designs of the prior art [2]

2×2 elements in configurable arrays have been used in the prior art based on other different prior art structures. For example, a 2×2 tunable switch has been used as a fundamental block in programmable photonic integrated circuits [1-2]. FIG. 9 shows the concept and typical design of a 2×2 tunable switch. FIG. 10 is a drawing showing some typical array designs of the prior art, based on 2×2 tunable switches (left three pictures [2]) and realization of various functional components using such an array (right picture [3]).

Figure 11:
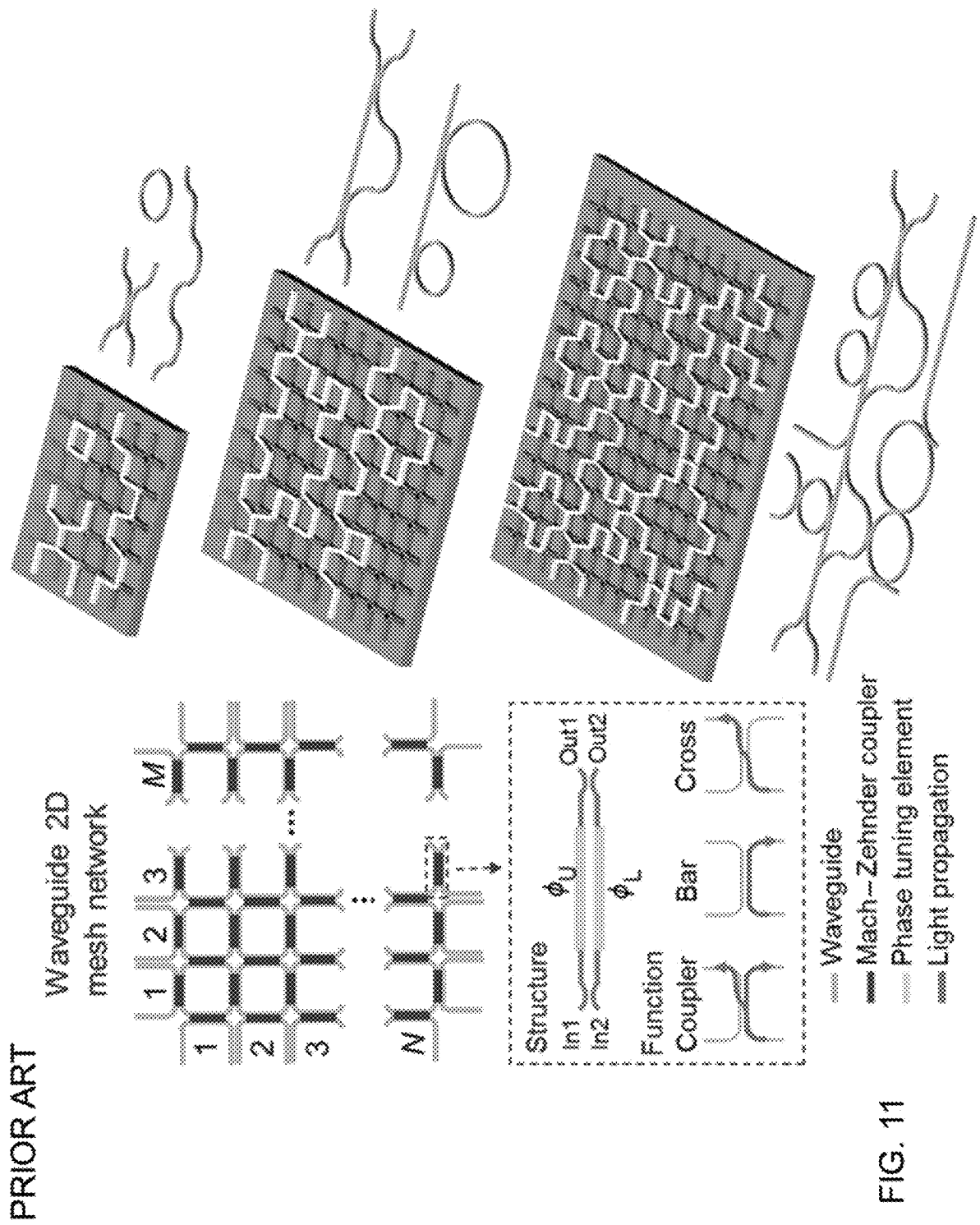
FIG. 11 is a drawing showing various functional components a prior art array of the prior art [3].

FIG. 9 is a drawing showing how a prior art concept of a 2×2 tunable switch and typical designs of the prior art as described in reference [2]. These concepts can be implemented using the new tunable waveguide element and 2×2 switch array elements of the Application. FIG. 10 is a drawing showing typical array design based on 2×2 tunable switches also as described by reference [2]. FIG. 11 is a drawing showing various functional components a prior art array as described in reference [3]. The concepts of FIG. 10 and FIG. 11 can also be implemented using the new tunable waveguide element and 2×2 switch array elements of the Application.

Modeling, fabrication, configurations, and layouts of lithography-free integrated photonic FPGA and related elements and structures according to the Application can be accomplished by software supplied on a computer readable non-transitory storage medium as non-transitory data storage. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

REFERENCES FOR PART 1 TO PART 4

1. W. Bogaerts, D. Pérez, J. Capmany, D. A. B. Miller, J. Poon, D. Englund, F. Morichetti, and A. Melloni, "Programmable photonic circuits," Nature 586, 207-216 (2020).
2. J. Zheng, A. Khanolkar, P. Xu, S. Colburn, S. Deshmukh, J. Myers, J. Frantz, E. Pop, J. Hendrickson, J. Doylend, N. Boechler, and A. Majumdar, "GST-on-silicon hybrid nanophotonic integrated circuits: a non-volatile quasi-continuously reprogrammable platform," Opt. Mater. Express 8, 1551-1561 (2018).

3. C. T. Phare, Y.-H. Daniel Lee, J. Cardenas, and M. Lipson, "Graphene electro-optic modulator with 30 GHz bandwidth," Nat. Photonics 9, 511-514 (2015).
4. I. Datta, S. H. Chae, G. R. Bhatt, M. A. Tadayon, B. Li, Y. Yu, C. Park, J. Park, L. Cao, D. N. Basov, J. Hone, and M. Lipson, "Low-loss composite photonic platform based on 2D semiconductor monolayers," Nat. Photonics 14, 256-262 (2020).
5. S. Bae, H. Kim, Y. Lee, X. Xu, J.-S. Park, Y. Zheng, J. Balakrishnan, T. Lei, H. Ri Kim, Y. I Song, Y.-J. Kim, K. S. Kim, B. Özyilmaz, J.-H. Ahn, B. H. Hong, and S. Iijima, "Roll-to-roll production of 30-inch graphene films for transparent electrodes," Nat. Nanotechnol. 5, 574-578 (2010).
6. A. Castellanos-Gomez, M. Buscema, R. Molenaar, V. Singh, L. Janssen, H. S. J. van der Zant, and G. A. Steele, "Deterministic transfer of two-dimensional materials by all-dry viscoelastic stamping," 2D Mater. 1, 011002 (2014).
7. V. E. Benes, Mathematical Theory of Connecting Networks and Telephone Traffic (1965).
8. R. Soref, "Tutorial: Integrated-photonic switching structures," APL Photonics 3, 021101 (2018).
9. J. Nauriyal, M. Song, R. Yu, and J. Cardenas, "Fiber-to-chip fusion splicing for low-loss photonic packaging," Optica 6, 549-552 (2019).
10. J. Cardenas, M. A. Foster, N. Sherwood-Droz, C. B. Poitras, H. L. R. Lira, B. Zhang, A. L. Gaeta, J. B. Khurgin, P. Morton, and M. Lipson, "Wide-bandwidth continuously tunable optical delay line using silicon microring resonators," Opt. Express 18, 26525-26534 (2010).
11. M. Song, J. Steinmetz, Y. Zhang, J. Nauriyal, M. G. Baez, A. N. Jordan, and J. Cardenas, "Enhanced On-Chip Phase Measurement by Weak Value Amplification," in 2020 Conference on Lasers and Electro-Optics (CLEO) (2020), pp. 1-2.
12. M. Granados-Baez, A. Mukherjee, L. Qiu, C. Chakraborty, C. Chakraborty, A. N. Vamivakas, A. N. Vamivakas, and J. Cardenas, "On-Chip Monolayer WSe2 Microring Laser Operating At Room Temperature," in Conference on Lasers and Electro-Optics (2020), Paper SF2J.5 (Optical Society of America, 2020), p. SF2J.5.
13. C. T. Phare, C. T. Phare, J. Cardenas, Y. H. D. Lee, and M. Lipson, "Linear Graphene on Silicon Nitride Electroabsorption Modulators for RF-Over-Fiber Links," in Conference on Lasers and Electro-Optics (2016), Paper SF2G.2 (Optical Society of America, 2016), p. SF2G.2.
14. J. Cardenas, M. Yu, Y. Okawachi, C. B. Poitras, R. K. W. Lau, A. Dutt, A. L. Gaeta, and M. Lipson, "Optical nonlinearities in high-confinement silicon carbide waveguides," Opt. Lett. 40, 4138-4141 (2015).
15. J. Cardenas, C. B. Poitras, J. T. Robinson, K. Preston, L. Chen, and M. Lipson, "Low loss etchless silicon photonic waveguides," Opt. Express 17, 4752-4757 (2009).
16. X. Ji, F. A. S. Barbosa, S. P. Roberts, A. Dutt, J. Cardenas, Y. Okawachi, A. Bryant, A. L. Gaeta, and M. Lipson, "Ultra-low-loss on-chip resonators with sub-milliwatt parametric oscillation threshold," Optica 4, 619-624 (2017).
17. S. A. Miller, M. Yu, X. Ji, A. G. Griffith, J. Cardenas, A. L. Gaeta, and M. Lipson, "Low-loss silicon platform for broadband mid-infrared photonics," Optica 4, 707-712 (2017).

REFERENCES FOR PART 5

1. Harris, Nicholas C., et al. "Linear programmable nanophotonic processors." Optica 5.12 (2018): 1623-1631.
2. Bogaerts, Wim, et al. "Programmable photonic circuits." Nature 586.7828 (2020): 207-216.
3. Zhuang, Leimeng, et al. "Programmable photonic signal processor chip for radiofrequency applications." Optica 2.10 (2015): 854-859.

What is claimed is:

1. A tunable waveguide element comprising:
a waveguide core;
a waveguide cladding;
a high k dielectric layer between the waveguide core and the waveguide cladding; and
an electrode disposed between the high k dielectric layer and the waveguide core.

2. The tunable waveguide element of claim 1, wherein the electrode is made of a two-dimensional material.

3. The tunable waveguide element of claim 1, wherein the electrode is a monolayer.

4. The tunable waveguide element of claim 1, wherein the electrode is disposed in the high k dielectric layer.

5. The tunable waveguide element of claim 1, wherein the high k dielectric layer is disposed in the waveguide cladding.

6. The tunable waveguide element of claim 1, wherein the waveguide cladding is $SiO_2$.

7. The tunable waveguide element of claim 1, wherein the waveguide core comprises a silicon nitride or a silicon carbide.

8. The tunable waveguide element of claim 1, wherein the waveguide core comprises a lithium niobite or a lithium tantanate.

9. The tunable waveguide element of claim 1, wherein the waveguide core comprises a glass or a polymer.

10. The tunable waveguide element of claim 1, wherein the high k dielectric layer comprises an $Al_2O_3$ layer or a $HfO_2$ layer.

11. The tunable waveguide element of claim 1, wherein the electrode comprises a graphene monolayer.

12. The tunable waveguide element of claim 1, wherein the electrode comprises a transition metal dichalcogenide monolayer.

13. The tunable waveguide element of claim 1, wherein the electrode is configured to be charged with respect to a substrate on which said tunable waveguide element is disposed.

14. The tunable waveguide element of claim 1, wherein:
the electrode is a first electrode; and
the first electrode is configured to be charged with respect a second electrode.

15. The tunable waveguide element of claim 1, wherein:
the electrode is a first electrode; and
the tunable waveguide element further comprises a second electrode disposed on or in the high k dielectric layer and above or below the first electrode.

16. The tunable waveguide element of claim 1, wherein:
the waveguide core is a first waveguide core;
the tunable waveguide element further comprises a 2×2 switch; and
the 2×2 switch comprises the first waveguide core and a second waveguide core.

* * * * *